United States Patent
Frenken

(10) Patent No.: US 10,343,227 B2
(45) Date of Patent: Jul. 9, 2019

(54) PRESSING TOOL

(71) Applicant: GUSTAV KLAUKE GMBH, Remscheid (DE)

(72) Inventor: Egbert Frenken, Heinsberg (DE)

(73) Assignee: GUSTAV KLAUKE GMBH, Remscheid (DE)

(*) Notice: Subject to any disclaimer, the term of this patent is extended or adjusted under 35 U.S.C. 154(b) by 44 days.

(21) Appl. No.: 15/982,463

(22) Filed: May 17, 2018

(65) Prior Publication Data

US 2018/0264563 A1 Sep. 20, 2018

Related U.S. Application Data

(62) Division of application No. 14/413,672, filed as application No. PCT/EP2013/064472 on Jul. 9, 2013, now Pat. No. 9,993,885.

(30) Foreign Application Priority Data

Jul. 10, 2012 (DE) .................. 10 2012 106 186
Mar. 1, 2013 (DE) .................. 10 2013 102 037

(51) Int. Cl.
*B23D 17/02* (2006.01)
*B23D 29/00* (2006.01)
(Continued)

(52) U.S. Cl.
CPC ............ *B23D 17/02* (2013.01); *B25B 27/146* (2013.01); *B26B 15/00* (2013.01); *H01R 43/0428* (2013.01); *B23D 29/00* (2013.01)

(58) Field of Classification Search
CPC .... B26B 15/00; H01R 43/0428; B23D 29/00; B23D 17/02; F16H 37/084; B25B 27/146;
(Continued)

(56) References Cited

U.S. PATENT DOCUMENTS 5,553,478 A 9/1996 Di Troia
5,735,353 A 4/1998 Undin
(Continued)

FOREIGN PATENT DOCUMENTS

DE 19709017 6/1998
DE 19802287 12/1998
(Continued)

OTHER PUBLICATIONS

International Search Report and Written Opinion for PCT//EP2013/064472 dated Oct. 17, 2013, 13 pages.

*Primary Examiner* — Shelley M Self
*Assistant Examiner* — Joseph Finan
(74) *Attorney, Agent, or Firm* — Klintworth & Rozenblat IP LLP

(57) ABSTRACT

A motorized manually operated pressing tool, in particular a crimping tool, with a fixed holding part, in which at least one pressing jaw is pivotably mounted about a pivot axis. The pressing jaw forms a working area and an impingement region extending in the longitudinal direction of the pressing jaw. In order to carry out a pressing operation the impingement region can be acted upon with an impinging part that is movable relative to the impingement region. The impinging part is movable in the longitudinal direction of the impingement region by exertion of manual force and by a motor.

2 Claims, 25 Drawing Sheets

(51) Int. Cl.
*B25B 27/14* (2006.01)
*B26B 15/00* (2006.01)
*H01R 43/042* (2006.01)

(58) Field of Classification Search
CPC . B25B 25/00; B25B 25/005; Y10T 29/49908; Y10T 29/49913; Y10T 29/49925; Y10T 29/49927; Y10T 29/49929; Y10T 29/53996; B23P 15/005
USPC ............. 72/416, 407, 409.01, 482.6; 81/342, 81/348–351, 364, 366, 374, 376, 377, 81/9.4–9.44, 385, 387, 388–390
See application file for complete search history.

(56) References Cited

U.S. PATENT DOCUMENTS

| | | | |
|---|---|---|---|
| 5,806,362 | A | 9/1998 | Dubugnon |
| 6,035,775 | A * | 3/2000 | Nghiem ............... B21D 39/046 100/233 |
| 6,053,025 | A | 4/2000 | Beetz et al. |
| 6,662,620 | B1 | 12/2003 | Baron et al. |
| 7,603,932 | B2 | 10/2009 | Newcomb |
| 2007/0214859 | A1 | 9/2007 | Bowles et al. |
| 2010/0000288 | A1 | 1/2010 | Barezzani et al. |
| 2010/0275672 | A1 | 11/2010 | Frenken |
| 2012/0102763 | A1 | 5/2012 | Rozumovich |

FOREIGN PATENT DOCUMENTS

| | | |
|---|---|---|
| EP | 0679476 | 4/1995 |
| WO | 99/19122 | 4/1999 |
| WO | 2007/082951 | 7/2007 |

\* cited by examiner

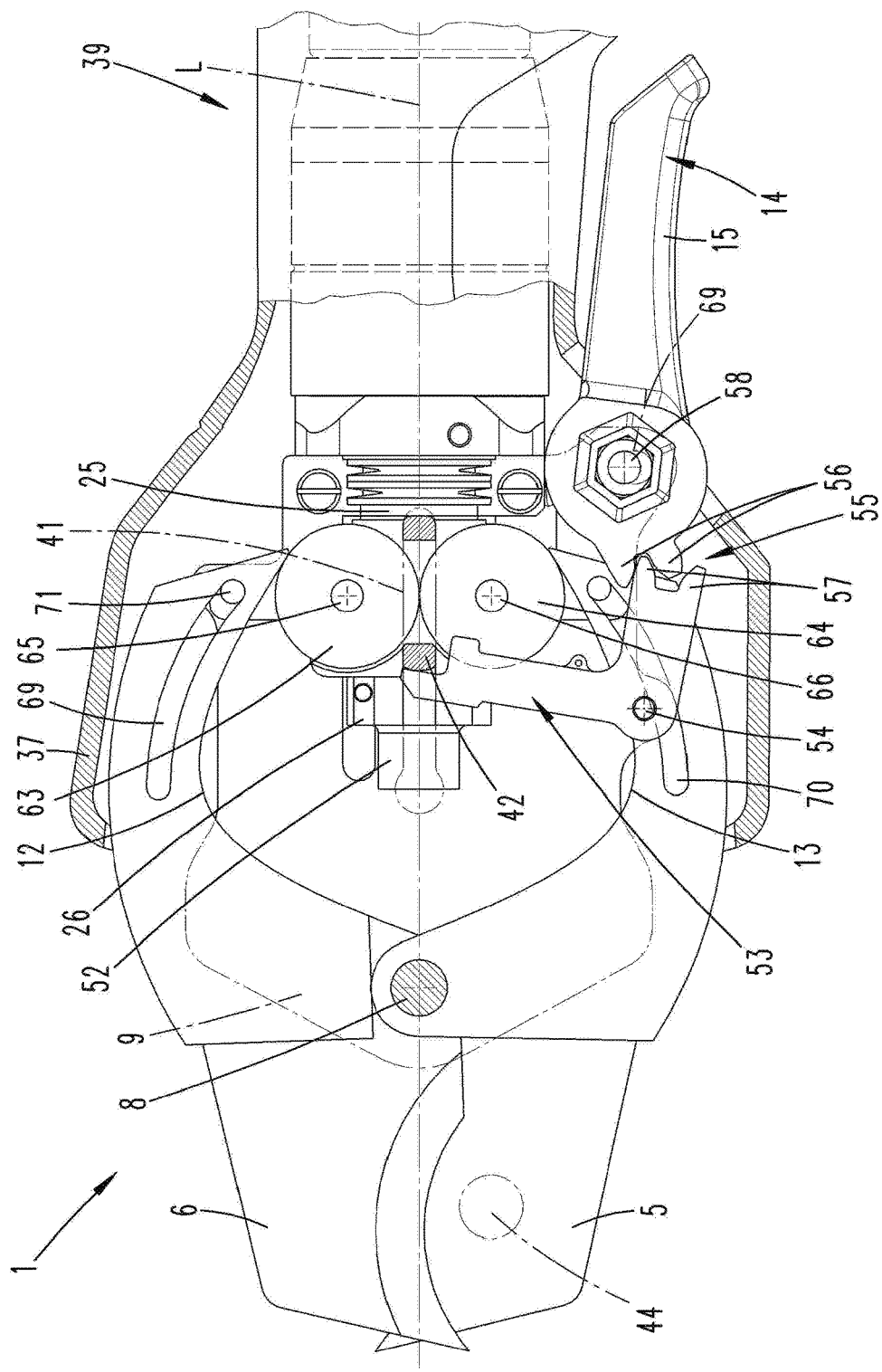

PRESSING TOOL

CROSS-REFERENCE TO RELATED APPLICATIONS

This patent application is a divisional application of U.S. Ser. No. 14/413,672, filed Jan. 8, 2015, which is a 371 of PCT/EP2013/064472, filed Jul. 9, 2013 which claims the benefit of German Patent Application 10 2012 106 186.6, filed Jul. 10, 2012 and German Patent Application 10 2013 102 037.2, filed on Mar. 1, 2013, the entire contents of which are incorporated by reference in their entirety.

FIELD OF THE INVENTION

The invention relates to a motorized manually operated pressing tool, in particular a crimping tool, with a fixed holding part, in which at least one pressing jaw is pivotably mounted about a pivot axis, said pressing jaw forming a working area on the one side of the pivot axis and an impingement region on the other side, wherein in order to carry out a pressing operation the impingement region can be acted upon with an impinging part that is movable relative to the impingement region.

BACKGROUND OF THE DISCLOSURE

Such a pressing tool is known for example from U.S. Pat. No. 6,662,620 B1. In addition, reference is to be made for example to prior art in accordance with DE 197 09 017 A1, and additionally to EP 679 476 B1 (U.S. Pat. No. 5,735,353 A).

In the pressing device known from the first mentioned document, the pressing is carried out in a motorized manner by rotation of an impinging part acting via a cam region upon the impingement region of the pressing jaw. Manual activation is not possible. In the pressing device known from DE 197 09 017 A1, the mobile pressing jaw is moved linearly while the impinging part carries out a movement perpendicular thereto. To be sure it is both possible, and in particular first of all, to act on the impinging part by manual force. However, the pressing device must be modified in the area of the pressing jaws and the impinging part, which is relatively expensive.

In the pressing device known from EP 679 476 B1 (U.S. Pat. No. 5,735,353 A), which has a linearly movable pressing jaw, manual activation is also possible. To this end, the linearly movable pressing jaw is moved as a whole towards the rigidly fixed pressing jaw, positioned opposite to it. Manual force can also be applied first of all to the movable pressing jaw, for example for clamping a workpiece. To initiate a pressing operation, the handle cover of the handle moves in a pivoting manner about a pivot axis formed for this purpose in the handle, against the force of a spring. A corresponding switch is arranged directly in the handle that is moved.

SUMMARY

Starting from the cited prior art, the object of the invention is to specify a motorized manually operated pressing tool with a pivotable pressing jaw, in which a pressing operation is carried out inexpensively and with a simple design.

A possible solution to achieving the object, according to a first idea of the invention, is provided by a pressing device in which the linearly moved impinging part is movable in the longitudinal direction of the impingement region by the exertion of manual force, and additionally by motorized means. A longitudinal extension of the pressing jaws and a motion of the impinging part are oriented in the same direction. This results in a pressing device which can be activated both manually and by motorized means, which can be implemented in an elongated rod-shaped manner, wherein in the region of the pressing jaws a maximum width of the pressing device must be geared towards the width of the pressing jaws (alone). No costly linkage is required for guiding the pressing jaws. The pressing jaws themselves can each be rotary-mounted at a fixed pivot point.

To exert the manual force, the impinging part can comprise a corresponding continuation, which can be designated as a handle part. Force can also be applied to the impinging part by means of a lever part or another transmission part.

According to a further idea of the invention a further possible solution to the problem is provided by a manual pressing tool in which, in a plan view of the pressing tool in which the pivot axis of the pressing jaw is shown dotted, an axially fixed threaded spindle extends until it overlaps with the impingement region perpendicular to a longitudinal axis of the threaded spindle. If it also preferred that in side view the threaded spindle can be projected onto the impingement region, then the overlap also immediately becomes of more general importance, however. In the side view, the threaded spindle can also in principle extend to the cover area, spaced vertically apart therefrom.

The lateral view mentioned is preferably such that it is arranged at right angles to said pivot axis. The pivot axis is then shown as a line.

According to a further idea of the invention a further possible solution to the problem is provided by a manually operated pressing tool in which the pressing jaw can be moved into a clamping position by manual action, the motorized movement is triggered according to a clamping pressure applied by hand and on the triggering of the motorized movement a switching movement is produced by a displacement of a mounting axle of the manual lever relative to the lever part, or by a displacement of an activation part, wherein the activation part to which the lever part is motion-coupled is located on the far side of the mounting axle of the lever part, viewed from a free end of the lever part. This facilitates in particular a favorable arrangement of a switch for triggering the motorized movement. The gripping area of the lever part to be grasped by a user himself does not move. Nevertheless a user feels a certain unusual section of movement in the course of the transition to the motorized pressing operation.

A certain clamping pressure, which can be adjusted by a sprung mounting of the mounting axle or of the activation part, can be applied manually.

Independently of this, however, a separate detection of a clamping pressure can also be provided, which triggers the motorized support. This can be either supplementary to the above described triggering or by this means alone. Relating to this, the clamping pressure can be determined for example by a force sensor, additionally arranged for example within the pressing jaw. It can also be achieved by a component which responds to pressure, such as a spring, which is immovable up to a specific pre-tensioned pressure and can then be compressed as necessary.

The above mentioned activation part can be provided for example by a spring to be described hereafter, that enables a movement of the lever part relative to an axis, preferably constructed in this case directly on a pressing jaw, or by a control arm, with which a switching part is acted upon. The said axis, relative to which the lever part can alternatively or additionally continue to move, is preferably the axis of rotation of the lever part itself in its entirety.

The pressing jaw extends preferably with respect to its central plane parallel to a longitudinal axis of the threaded spindle. The pressing jaw can in this context, but also independently hereof, be in the form of a flat plate.

The threaded spindle, which hereafter is also referred to as a spindle, preferably has a metric thread. It cooperates with a spindle nut having an equivalent counter-thread in a suitable manner, hereafter also designated as a travelling part.

The spindle is preferably oriented such that it extends along a longitudinal direction of the pressing jaw. A certain small acute angle, enclosed with the longitudinal direction, can be present if necessary.

The fact that the spindle extends until it overlaps at the side of, or in some cases also above it, with a pressing jaw, or at least with an impingement region of a pressing jaw, facilitates on the one hand a configuration which is compact in the longitudinal direction of the manual pressing tool. On the other hand, by means of this spindle the impinging part can be acted upon in direct proximity to the impingement region. Due to the fact that the spindle is fixed, i.e. cannot move in the axial direction, but of course can be driven into rotation about its own axis, only a rotary drive of the spindle is required, in order nevertheless to obtain a movement of the impinging part along the impingement surface.

In another alternative description of the invention, an important feature of a manual pressing tool such as described at the outset is that, in order to carry out the pressing operation, the impinging part must be moved from a position near to the working area to a position distant from the working area. To carry out a pressing operation the impinging part is preferably pulled by the motor towards the motor.

Hereafter and in the description of the figures and the drawing, additional features of the invention are often described and/or illustrated in their preferred assignment to the design already discussed above, but they can also be significant however in an assignment to only one or a plurality of individual features that are described here or are represented graphically, or independently or in another overall design.

It is preferred that the lever part is hinge-coupled to the impinging part. The lever part can in this case be arranged in a, possibly first, longitudinal extension intersecting the direction of motion of the impinging part. More preferably however, the hinge connection with the impinging part is provided on the mounting part or on a housing area of the pressing device, separately to a mounting of the lever part.

The lever part can also cooperate with the impinging part by means of a positive-locking fit. For example, in the manner of a toothing system. If necessary also by means of an intermediate part, which is arranged as an additional part between the lever part and the impinging part.

The lever part can more preferably be moveable relative to the housing in the mounting area. In this case it is advantageous if the lever part is placed into a first mounting location under spring tension. The effect of the spring tension is that at first the lever part does not move in this mounting part when the lever part is moved. However when a specific threshold force which acts on the lever part in the mounting area is exceeded, a movement of the lever part in the mounting area can result.

This movement of the lever part is more preferably used for indicating that the motor can be hereby switched on or off. This can occur as a result of the movement of the lever part in the mounting area. The threshold force corresponds in this respect to the clamping pressure referred to above. When the motor is switched on, the motor-supported activation of the pressing jaws begins. For the user, the manual force is as it were amplified by the action of the motor, significantly or by several times.

The impinging part can act on the pressing jaw via a control arm, which also corresponds to the above mentioned intermediate part. The impinging part can also, however, be implemented for example as a roller which can be moved linearly with respect to its axis, which acts on an impingement region of the pressing jaw which is correspondingly curved in the direction of travel of the impinging part. On this point, reference is made for example to an impingement of the pressing jaws such as is known from WO 2007/082951 A1 and/or US 2010/0275672 A1.

More preferably, a travelling part is provided, that can be made to act upon the impinging part in a motorized manner. In particular at the point when the motor support is triggered in the described manner, the travelling part travels into an attachment to the impinging part, if it is not already located there, and then moves the impinging part further with motor power, so that the pressing operation is completed.

The impinging part and the travelling part can preferably be moved coaxially. More preferably both are arranged on a spindle, surrounding them, wherein the spindle is used to provided the motorized actuation of the travelling part. The impinging part on the other hand preferably uses the spindle only as a linear guide. It can also be guided independently of the spindle, but still assigned to this or surrounding it. The impinging part can be moved relative to the fixed spindle, while the travelling part can preferably only be moved by the driven, rotating spindle, at least in regard to a motor-supported pressing operation, but more preferably also with regard to withdrawal from a pressing position into a starting position.

The combination of the elongated pressing jaws extending in the longitudinal direction of the pressing device with a spindle driven by an electric motor, preferably via a gearing unit which is more preferably a reduction gear unit, which extends in an overlapping manner to the impingement regions of the pressing jaws and preferably centrally lengthwise between the impingement regions of the pressing jaws, in addition possibly with a rechargeable battery and/or a mains connection with respect to the electric motor, also has independent significance. This means that the elongated rod-shaped device can be implemented in a comparatively short time. It is particularly preferred that the device has an overall length that corresponds to 2½ to 4 times the length of the pressing jaws (only).

Furthermore, the impinging part and/or the travelling part must be moved against the force of a reset spring. It is additionally preferred that the reset spring assigned at a more advanced stage of the pivoting of one or both of the pressing jaws from a rest position into a pressing position of a pressing jaw, should have a steeper spring characteristic than that assigned to the start of the pivoting. In particular, the reset spring can also be constructed from multiple parts. It is additionally preferred that the steeper spring characteristic is provided to this extent by means of a disk spring or a disk spring section of the reset spring, which overall is constructed from multiple parts.

With respect to the execution of a pressing operation it is also preferred that, depending on a force threshold value being exceeded before the complete execution of the pressing operation, a release of the lever part only causes a stoppage of the movement of the pressing jaw. Until the force threshold value is reached, a release of the lever part causes a withdrawal of the impinging part, with the result that the pressing jaw can also pivot back into a starting position. This is correspondingly also the case if the said threshold value is not detected or not evaluated.

The force threshold value can be determined, for example, via the motor current of the electric motor driving the impinging part, preferably also driving the spindle. Exceeding a certain threshold value of the motor current can be equated with this force threshold value.

It is also preferred that before a complete execution of a pressing operation a switch activated release of the impinging part for a return movement can be carried out. This is to enable a pivoting of the pressing jaw into an opening position. In the course of a pressing operation that is to be carried out, it can arise for example that, for example based on incorrect insertion of a part or a combination of parts to be crimped into the pressing jaws, there is a risk of an incorrect pressing operation taking place. If this is detected, the return movement can be obtained by the release of the impinging part and so the part to be crimped or the combination of parts to be crimped can be released again before complete execution of the pressing operation.

The release of the impinging part can be more preferably implementable by a movement of the lever part under exertion of manual force, differently to a movement of the lever part applied in the case of a pressing operation. This can be, for example, by pressing or pivoting in another direction than is provided for carrying out a pressing operation. In particular by a pivoting in the opposite direction.

With respect to the cooperation of the lever part with the switch initiating the motor-actuated movement of the pivoting jaw, it can also be provided that the control arm first of all acts upon a pivotably moveable switch part and this switch part is in cooperation with the aforesaid switch.

It is this measure in particular which can enable the lever part to carry out only one rotation about an axis of rotation during activation. More preferably, in a plan view of the manual press tool, preferably relative to a view in which the pivot axis is shown dotted, the lever part can again be rotatably mounted on the side of the spindle on which the lever part is exposed for the purpose of activation.

In order to control the manual pressing tool, two or more switches are provided, as already discussed.

Preferably four switches are provided.

It is further also preferred that the two or more switches, preferably all the switches that are provided, are arranged on a common circuit board. The circuit board can be arranged to extend such that it overlaps the spindle and/or the impinging part.

In addition, a lighting means can also be provided, which is arranged to radiate in a direction of motion of the movement part. In particular, this lighting means can also be provided on the said circuit board.

It also preferable that a supply of lubricant assigned to the spindle is provided. The purpose of this is to continuously supply the spindle with lubricant during operation, especially in light of a large number of planned operating hours. The assignment can be provided in such a manner that the spindle continuously passes through the lubricant supply, which can also be provided in a certain contact with the spindle. It is further preferred that the lubricant supply is provided at one end of the spindle. For this purpose a pot-like container, for example, assigned the free end of the spindle can be provided. The pot-like container can be opening onto the spindle. It can also be arranged to overlap with an end region of the spindle. In this case, but preferably also independently of such a configuration, the free end of the spindle constantly moves in the region of the lubricant supply.

It is further also preferred that a counting device is provided in the manual pressing tool for counting the pressing operations, for example crimping operations, carried out. In this context, preferably only completely executed pressing operations are registered as pressing operations. In addition, failed activations are also registered. Also when a threshold value is exceeded with respect to the manual force, particularly preferably with respect to the motor current, such a process is not evaluated and counted as a pressing operation but as a failed activation.

The lever part can furthermore act upon the impinging part via an already mentioned intermediate part, which is preferably implemented as an intermediate lever. In this case the lever part can cooperate with the intermediate part, resp. intermediate lever, by means of a toothing system.

It is also particularly preferred that the lever part is a plastic part, for example a plastic injection molded part, thus preferably consisting of a hard plastic. By contrast the intermediate part, in particular the intermediate lever, can be a metal part. In this case it is also preferred that the tooth widths are different. In this case it is additionally preferred that the tooth width is smaller on the metal part and larger on the plastic part. The tooth width of the plastic part can be for example between 1.1-3 times the tooth width of the metal part. The tooth intervals are correspondingly smaller on the plastic part and larger on the metal part. This allows a favorable utilization of the material to be obtained.

It is also further preferred that only a partial withdrawal of the impinging part can be set. This can be important if a plurality of workpieces that require only a relatively slight opening of a pressing jaw is to be processed in sequence. Time savings can then be obtained because it is no longer necessary to wait for a complete opening position of the pressing jaws to be reached each time.

This partial withdrawal of the impinging part can be obtained, for example, by a value of the spindle position corresponding to a pressing start being stored and in this spindle position, which then corresponds for example to a certain rotary position of the spindle, a stoppage of the spindle occurs during the withdrawal of the travelling part/impinging part. If necessary this position can be calculated with a certain allowance, so that a favorable insertion of a part to be pressed into the pressing jaws continues to be possible. The start of a pressing operation, or a position of the spindle associated therewith, can be detected for example by a pressure which is sensed by means of a pressure sensor (activation pressure on a press blank/workpiece). In this context a certain allowance is made in a suitable manner regarding the spindle position in the return stroke, in order to enable a new workpiece to be readily picked up in this position.

In particular, the storage of the value corresponding to a start of the pressing and/or the partial withdrawal can also be triggered by an activation sequence. For example, if the lever part is moved in rapid succession, and for example also when the motorized pressing has already begun.

The above-mentioned storage and/or determination of the position of the impinging part and/or of the travelling part can be obtained in particular by utilizing the determination of the angle of rotation of an electric motor, in principle a simple direct current motor. This also preferably occurs without additional sensors, based solely on a voltage and current measurement.

The above-mentioned separate actuation, that can lead to the process of storing the position of the spindle at the start of the pressing operation, can also be provided by the fact that after triggering the motor support the spindle does not continue to turn automatically until the pressing operation is completed, but rather a section of movement is interposed in which the manual pressure continues to be required, in order to invoke the motor-supported pressing. To this extent a gradual travel can then be undertaken in this region. This gradual motion can be interpreted by a set of evaluation electronics of the device as a signal that the pressing operation has started, and based on the spindle position assigned to this start, then after a successfully completed pressing operation the withdrawal takes place.

The gradual movement into a first contact with the workpiece can also be undertaken by a user and the transition to a steady pressing (spindle position associated therewith) then stored as a value, up to which the spindle (if necessary again with a certain allowance) returns after a completed pressing operation.

A certain sequence of movements can also be made in order to obtain the complete return to the initial position again. This can be provided for example by the fact that the handle part or activation part, in particular the activation lever, is designed to be moved in the opposite direction to its usual motion, which triggers the clamping or pressing operation. And to an end region of this movement a sensor may be assigned, the signal of which is then additionally evaluated to execute a complete withdrawal of the movement part/impinging part respectively in turn. This can correspond to a movement of the handle part in an emergency opening.

With respect to the position of the spindle, the calculation can exploit the fact that a spindle angle of rotation corresponds to the integral of the number of revolutions of the spindle over time. Because the number of spindle revolutions is in turn proportional to the voltage induced in the coils of the motor, the spindle position can also be calculated from this. Taking into consideration a proportionality constant, the path of the travelling part can be calculated with sufficient accuracy from the measurement variables of motor voltage and motor current. This is the case both for the motor supported pressing operation until the limit switch is reached and until the device is switched off during the return stroke up to the selected (intermediate) start position.

With regard to the disclosure the ranges and/or value ranges or multiple-field ranges specified above and hereafter also include all intermediate values, in particular in 1/10 steps of the respective dimension, possibly therefore also including dimensionless terms, thus for example 1/10 (of the length or the x-fold value), firstly in order to restrict the given range boundaries from below and/or from above, but alternatively or additionally also with regard to a disclosure of one or a plurality of singular values from the respectively indicated range. If therefore, for example, a range (for a length) is specified with a 3 to 5-fold multiple (of a width), then the 3.1-5-fold, the 3-4.9-fold, the 3.1-4.9-fold, the 3.2-5-fold range etc. is also disclosed, wherein the same applies with regard to dimension bearing ranges, i.e. for example the range of a length from 3 mm to 5 mm.

BRIEF DESCRIPTION OF THE DRAWINGS

Hereafter the invention is further explained on the basis of the enclosed drawing, which represents only one exemplary embodiment, however. The drawings show:

FIG. 25 is a representation in accordance with FIG. 24 in the closed position of the pressing jaws (cutting jaws).

DETAILED DESCRIPTION OF THE ILLUSTRATED EMBODIMENTS

Figure 1:
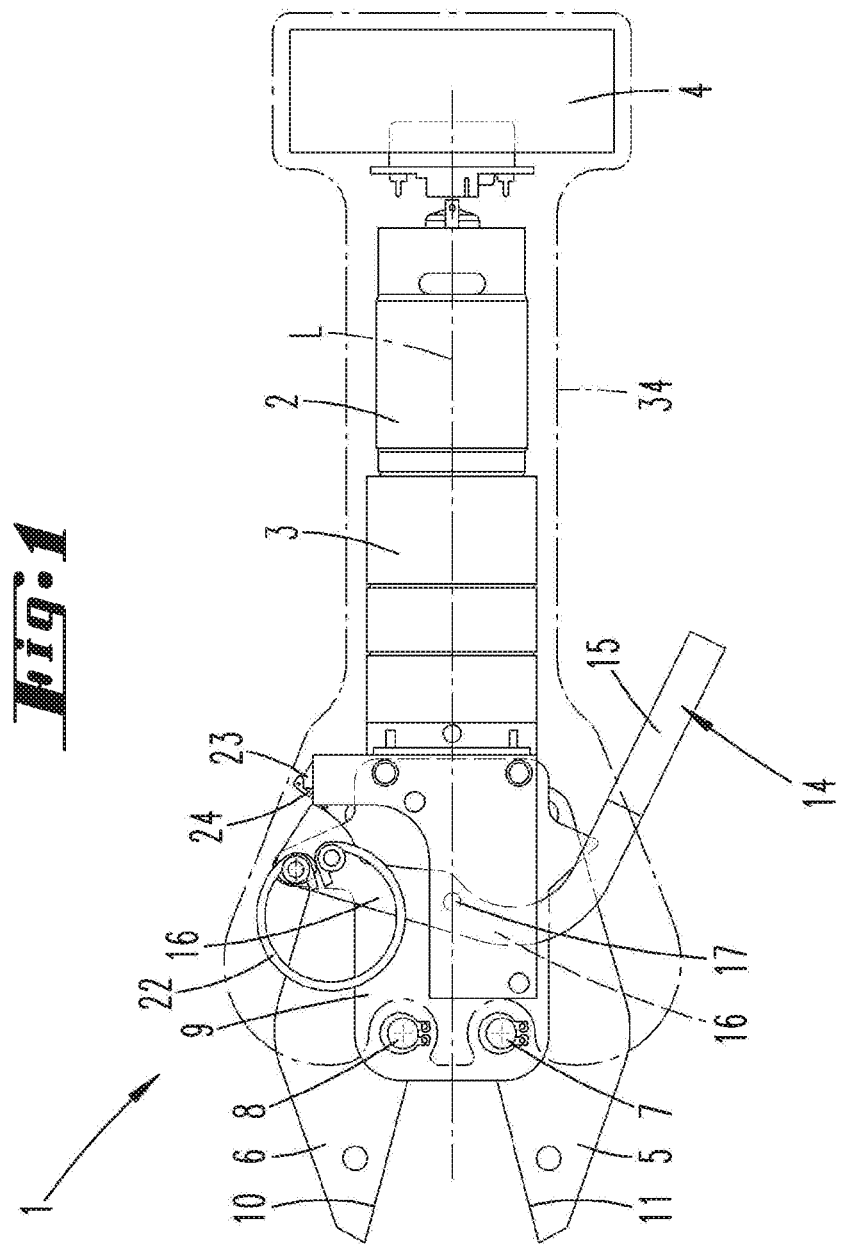
FIG. 1 is a side view of the pressing tool.

Represented and described is a motor-operated pressing tool 1 which comprises an electric motor 2 and a gearing unit 3 in a rod-like sequential arrangement. On the side 3 of the electric motor 2 facing away from the gears, a rechargeable battery 4 is provided, preferably additionally in a rod-like arrangement. A housing 34 is indicated in FIG. 1 by a dashed line.

The pressing tool 1 is preferably also formed only in a rod-like manner, with no branching housing part (in relation to a plan view, for example in accordance with FIG. 1), perhaps comparable in contour to a flashlight. A head region, the contours of which are thickened relative to a handle region, is defined by the external contour of the pressing jaws and/or a housing part overlapping them (and with respect to the movement, surrounding them with a certain amount of play in the closed position).

At the end opposite the working area, a battery is preferably arranged. As is evident in FIG. 1, this can mean a thickening of the housing or the rod end respectively. It can however also be designed to be aligned with the contour of the handle region, that is, as it were as a further extension of the handle region.

The working area of the pressing tool 1 is formed by two pressing jaws 5, 6, which are preferably both mounted in a rotational manner, in the exemplary embodiment so that they can pivot about axes 7, 8, on a support part 9 of the pressing tool 1.

The pressing jaws can be constructed with both a cutting and/or pressing geometry, which is not shown in detail. Such a configuration is provided, for example, in the case of the pressing jaws of the pressing tool known from the above cited document DE 197 09 017 A1. Alternatively, pressing inserts can also be fixed to the working areas of the pressing jaws. In this regard reference is made to the configuration in a pressing tool in accordance with DE 198 02 287 C1 or U.S. Pat. No. 6,053,025 A. On the rear of the respective working area 10, 11 of a pressing jaw 5, 6, an impingement region 12, 13 is formed on each pressing jaw, extending in the longitudinal direction of the pressing jaw. The longitudinal direction of the impingement region in the exemplary embodiment is the same longitudinal direction as that of the rod-shaped pressing tool 1 overall. It corresponds to a longitudinal axis L of the pressing tool. An impingement region is preferably constructed on the inner edge of a pressing jaw. In the case of two pressing jaws, the impingement regions are preferably designed to be facing one another.

In addition it is also the case that a pressing jaw 5, 6 is elongated perpendicular to the axes 7, 8, i.e. with a length larger than its width. Also, to this extent a longitudinal direction of the pressing jaws 5, 6 is formed.

Figure 2:
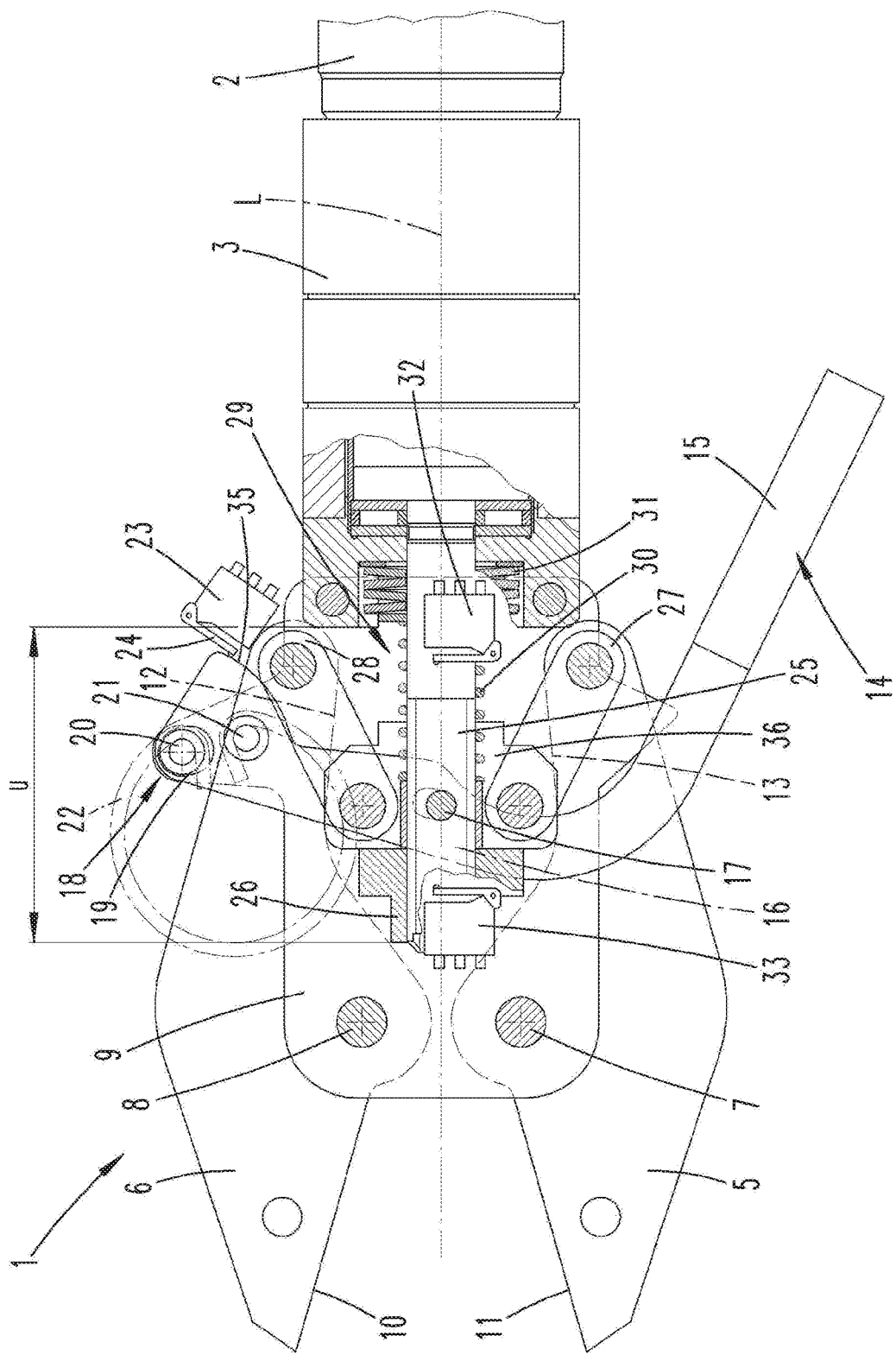
FIG. 2 is an enlarged representation of the working head shown in accordance with FIG. 1, before the start of a pressing operation.

In order to carry out a pressing operation, an impinging part 36 is provided (see for example FIG. 2). The impinging part 36 is movable relative to both of the impingement regions 12, 13 in the exemplary embodiment, of both of the two pressing jaws 5, 6 also shown in the exemplary embodiment. It is preferably to be moved in the longitudinal direction of a pressing jaw 5, 6, or of an impingement region 12, 13 of a pressing jaw.

In a first exemplary embodiment, in relation to FIGS. 1 to 19, on account of the specifically implemented control arm activation of the pressing jaws, to be explained in detail below, the impingement regions are not acted upon by a longitudinal movement of a part such as a roller, but rather moved by the control arm activation alone, without direct application of force.

In addition the impinging part 36 can preferably be moved linearly and in the longitudinal direction of the impingement regions 12, 13 it is movable both by exertion of manual force by means of a lever part 14 and in a motorized manner by the motor. The impinging part can be also be movable by motorized means alone.

Independently hereof the essential constructional design of the pressing tool is also of importance. With regard to the representation of FIGS. 1 and 2, in which it is evident that the geometrical pivot axes 7, 8 are shown as dots, a fixed spindle 25 is provided in the direction of longitudinal extension of the pressing jaws 5, 6. This spindle is fixed in the axial direction. More preferably, the spindle is also fixed in the radial direction. It can however be rotated around its longitudinal axis in order to implement the spindle function. With this spindle, that correspondingly extends in its longitudinal direction, preferably with a lateral overlap, compare overlap region u relative to the plan view in accordance with FIG. 2, to one or both impingement regions 12, 13, in a compact design the impinging part 36 can be driven to the final action upon the pressing jaws 5, 6. Fundamentally this constructional configuration is also significant without any additional and/or preferably initial, possible manual activation by the lever part 14.

Figure 3:
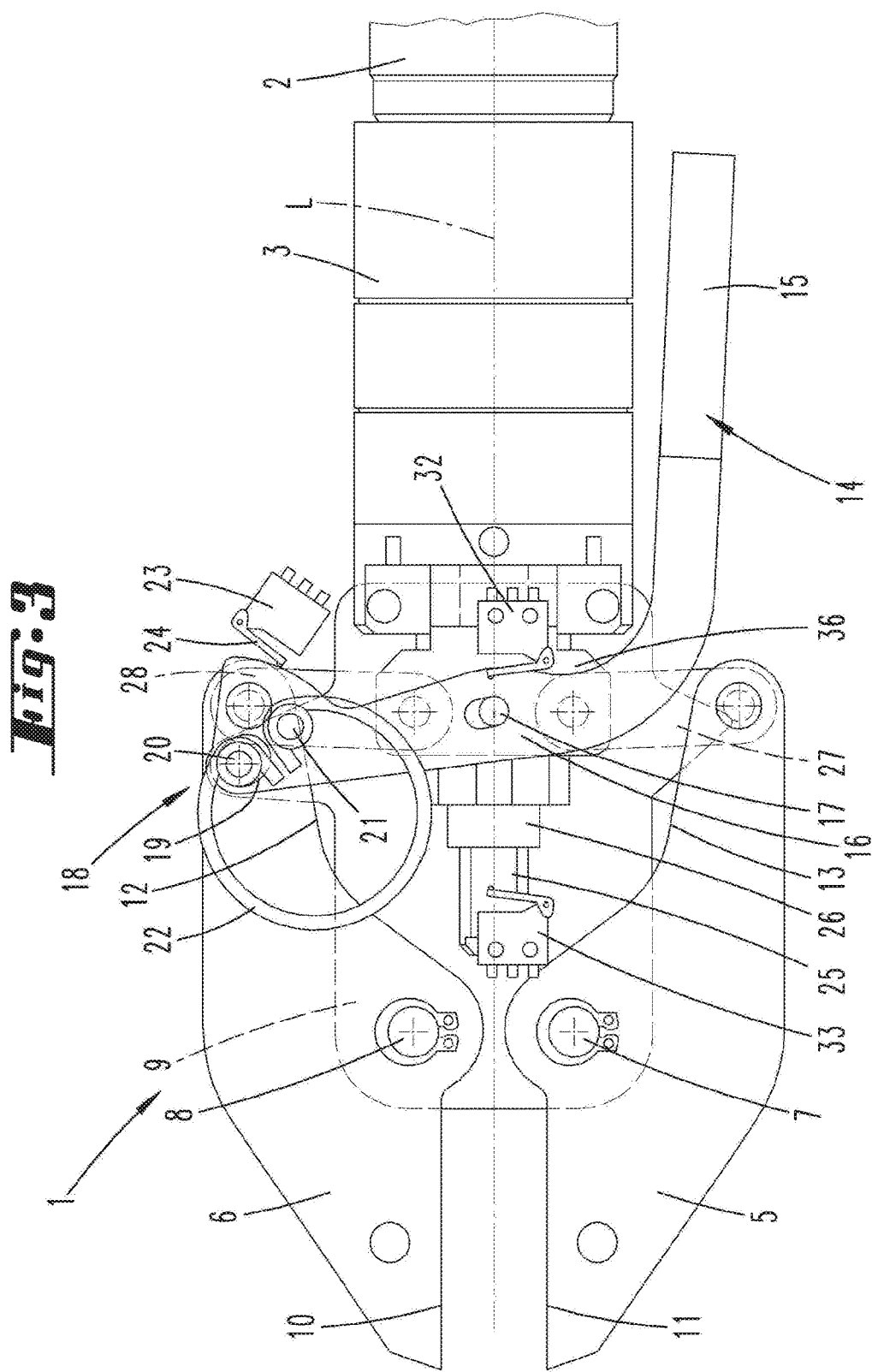
FIG. 3 is a representation in accordance with FIG. 2, showing an almost complete pressing operation.

A further general characterizing feature is given by the fact that in order to carry out the pressing operation the impinging part 36, preferably moved by the spindle 25, must be moved from a position near the working area 10 or 11 to a position distant from the working area 10 or 11 (compare also the difference between FIGS. 2, 3).

The lever part 14 is preferably angular in shape, as in some exemplary embodiments. A first lever section 15 which has a second longitudinal extension is shown at least partially extending, in relation to a view of the press tool from below, in overlap with the motor and/or the gears. It serves as a handling region, which can be held by one hand that is holding the motor-/transmission area at the same time.

Relative to a plan view in accordance with FIG. 2 the lever part 14 lies on one side of the spindle 25, viewed more generally on one side of the longitudinal axis L of the manual pressing tool, free to be activated, but in accordance with one of the described embodiments it is rotatably mounted on the other side of the longitudinal axis L and/or the spindle 25 (compare also mounting region 18 yet to be explained in further detail below).

A second lever section 16 which has a first longitudinal extension extends at an angle hereto, wherein the motor and the transmission extend in the space enclosed by the angle. The second lever section 16 also intersects a longitudinal axis L of the pressing device. The angle enclosed between the first and second longitudinal extension is preferably an obtuse angle, more preferably an angle between 90° and 150°.

The lever part 14 and in the exemplary embodiment preferably the lever section 16 are preferably connected to the impinging part 36 by a hinge. For this purpose a rotary joint 17 is provided on the impinging part 36 and the lever part 14 or lever arm part 16 respectively. The lever part 14 is preferably of dual construction, extending on both sides of the impinging part 36, or at least preferably forked in the region of the impinging part 36. In addition, in plan view of the press tool preferably in accordance with e.g. FIG. 2, both parts or the forked area are overlapping.

The rotary joint 17 in this case is additionally preferably arranged between the mounting of the lever part 14, fixed to the housing, and the free end of the first lever section 15. In this arrangement the hinged connection between the lever part 14 and the impinging part 36 can be provided in such a manner that the lever section, on which the hinged connection to the impinging part 36 is constructed, can move relative to the impinging part 36 at least in its longitudinal direction.

The said housing-fixed mounting of the lever part 14 is preferably constructed at the end facing away from the lever arm section 15. Here a mounting region, preferably a rotary mounting region 18, is constructed on the support part 9.

The lever part 14 is moveable in the mounting region 18 relative to the support part 9 and/or to a housing 34 of the pressing tool 1. In detail, in the relevant area of the lever part 14 a slot 19 is constructed, which is penetrated for example by a pin 20 fixed to the support part.

A spring 22 which is preferably pre-tensioned acts between this pin 20 and a counter-bearing 21 fixed to the lever. The spring 22 seeks to move the counter-bearing 21 away from the housing-fixed mounting formed by the pin 20, so that the pin 20 is located in the slot 19 at a first end region. If the lever part 14 is now acted upon by manual force and the pressing jaws 5, 6 are thereby pivoted, they can thus be brought first by manual power into a position, in which a part gripped between the pressing jaws, for example a cable shoe, is held but in practise is not yet pressed. In this movement section, the mounting position does not change. The rotational mounting region 18 acts like a fixed bearing. If the manual force on the lever part is then further increased, the force of the spring 22 is eventually overcome so that the counter-bearing 21 is moved towards the pin 20 against the force of the spring 22.

This manual force corresponds to the clamping pressure applied manually to the workpiece which is held in a pressing jaw, in the exemplary embodiment preferably directly between the assigned pressing jaws 5, 6.

At the same time this motion causes a switch 23 to be no longer acted upon by the lever part 14. The lever part 14, and/or concretely in the exemplary embodiment the lever section 15, in order to act upon the switch 23 until the said movement takes place, preferably comprises a round section 35 which has a radius relative to the circumferential edge of the round section 35 that corresponds to the radial distance of a point of this circumferential edge from the first mounting site of the lever part 14, i.e. to a geometric midpoint relative to a plan view of the pin 20. If the switch 23 as a result is no longer acted upon by the lever part 14, this means that a pre-sprung switching arm 24 of the switch 23 can swing out and thus cause switching to occur. Actually in doing so the electric motor 2 is switched on, whereby a spindle 25 is set into rotation via a gearing unit.

Also, after a movement of the counter-bearing 21 towards the pin 20 has taken place, until the corresponding force decays again the then newly adopted mounting position is a fixed mounting position. This fixed mounting position is evidently also then supported by the travelling part 26, which is further explained hereafter. It then preferably no longer matters that another manual force is applied.

A travelling part 26 moves on the spindle 25, wherein said part is thus moved by the spindle 25, which is set into rotation by the motor, towards the impinging part 36, and then moves the impinging part 36 with motor power further in the longitudinal direction, towards the electric motor 2 of the pressing tool 1. The travelling part 26 can be implemented as a spindle nut to cooperate with the spindle 25.

The impinging part and the travelling part are then finally located in the position of FIG. 3.

The pressing jaws 5, 6 are moved by the impinging part 36, preferably via control arms 27, 28. One or both control arms 27, 28 are in this case connected on the one hand in a rotationally moveable manner to the impinging part 36 and on the other hand in a rotationally moveable manner to a pressing jaw 5, 6. The connection to a pressing jaw 5, 6 here is more preferably provided at one end of a pressing jaw 5, 6 facing away from a working area 10, 11 with respect to an axis 7, 8. As is evident, the control arms execute, relative to the longitudinal extension of the pressing jaws 5, 6, a positioning movement until they extend almost linearly oriented to each other. This results in a knee lever effect. It is also possible that the control arms 27, 28 are moved into a dead point position which in practice preferably corresponds to an aligned position, or even a certain amount beyond this. This however takes place first, preferably until shortly before the dead point position, against the force of a first part 30 of the reset spring 29. In a further region then against the force of a second part 31 of the reset spring 29.

The second part 31 of the reset spring 29 has a steeper spring characteristic, and in each case on cessation of the motor power causes a reverse movement of the impinging part 13 to a position where the top dead point position is no longer valid and according to the reset spring 29, or then in particular according to the first part 30 of the reset spring 29, a return movement takes place into the position according to FIG. 1. This return movement of the impinging part 13 is preferably linked to the return movement of the travelling part 26. The travelling parts 26 is preferably moved by means of the spindle 25, now rotated in the opposite direction by motor power, and so releases the space for the spring-supported return movement of the impinging part 13 which is not yet so far engaged with the spindle.

With regard to the switching of the electric motor, a second switch 32 is provided, which in the corresponding position of the impinging part 13 or travelling part 26 causes the electric motor to switch off and in the exemplary embodiment preferably initiates a reverse rotation of the electric motor, to move the travelling part 26 by means of the spindle 25 back into the starting position. Here, a third switch 33 is then more preferably provided, which finally turns off the electric motor until a new pressing operation takes place.

It is evident that the impinging part 36 and the travelling part 26 are coaxial and, as is the case in the exemplary embodiment can move on the spindle 25. In this case the travelling part 26 is in direct threaded engagement with the spindle 25, while the impinging part 36 overlaps the spindle in the manner of a sheath and is movable relative to the spindle without engagement with it.

Figure 4:
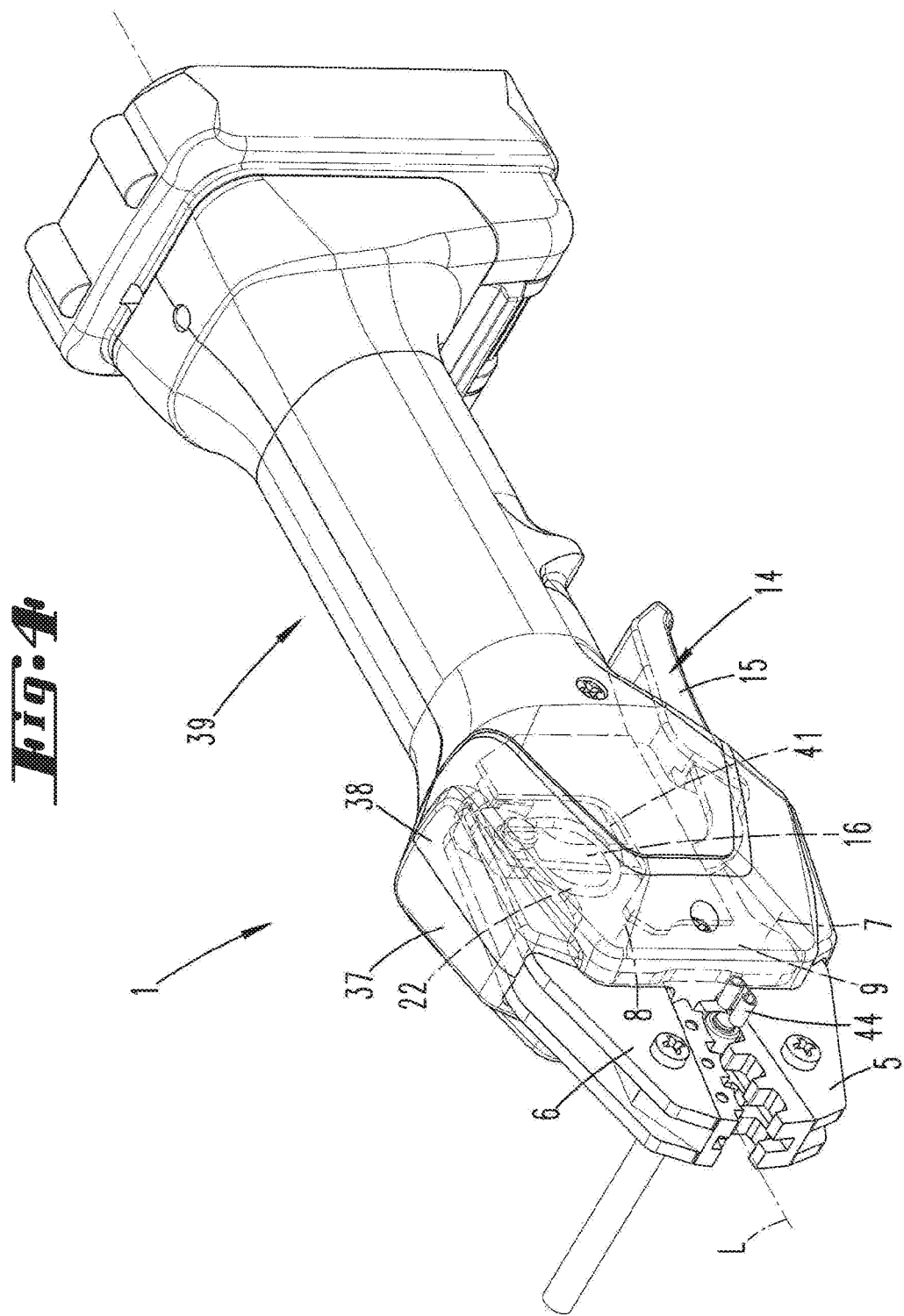
FIG. 4 is a perspective view of an entire manual pressing device.

In FIG. 4, a perspective representation of an entirely manual pressing tool is shown. Housing covers 37, 38 can be seen, which in the exemplary embodiment overlap the two pressing jaws 5, 6 in a lower region, i.e. one facing the body of the device. The overlap preferably extends beyond the axes 7, 8 and as is clear in the exemplary embodiment, about which the pressing jaws 5, 6 can be pivoted.

The lever part 16 protrudes downwards with respect to the lever section 15, i.e. towards the body of the device, on one side from a housing cover 37, 38. With regard to a handle region 39, the lever part 14, or the lever section 15, is arranged on the top, i.e. on the side with the pressing jaws.

Figure 5:
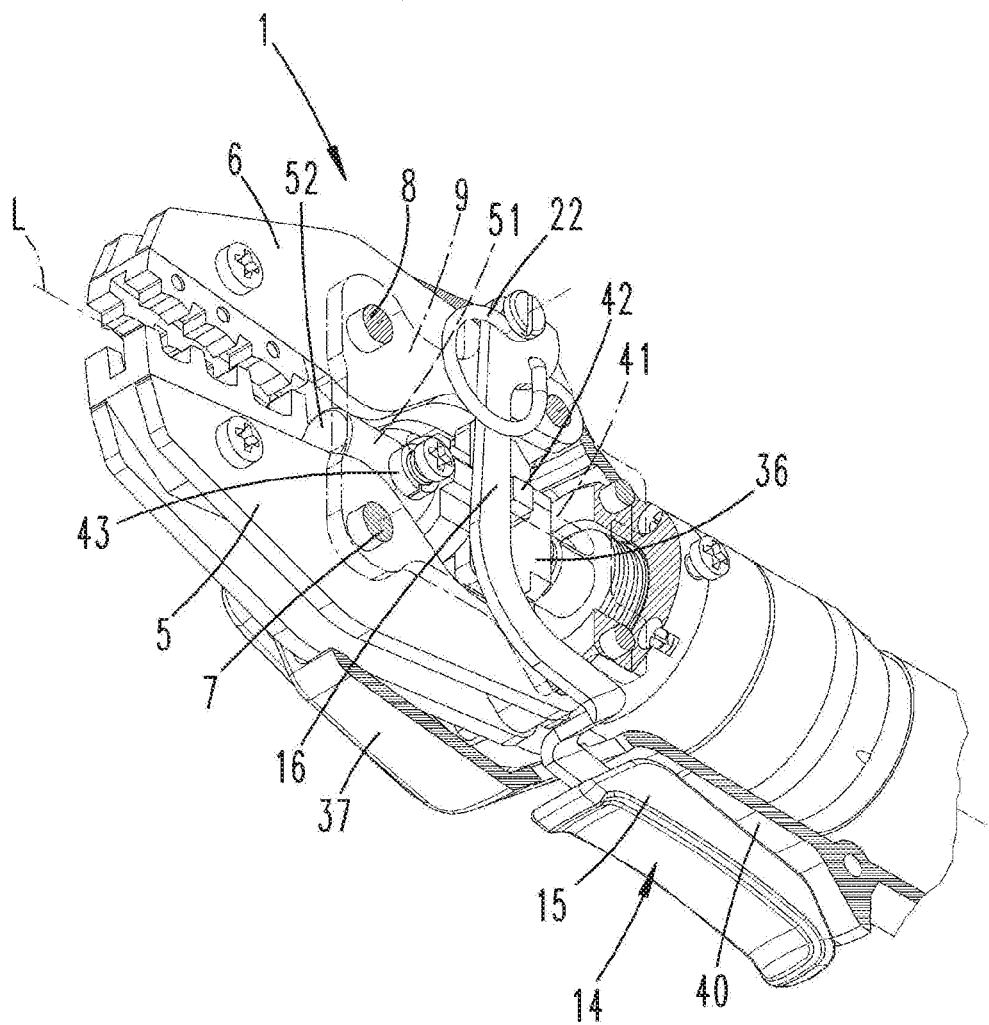
FIG. 5 is a perspective view of a device head, without cladding parts, obliquely from the front.

Further details on this point can also be deduced from FIG. 5. In particular that it is provided that in the activated condition, as forms the basis of FIG. 5, the lever section 15 fits into a correspondingly formed housing receptacle 40.

Figure 6:
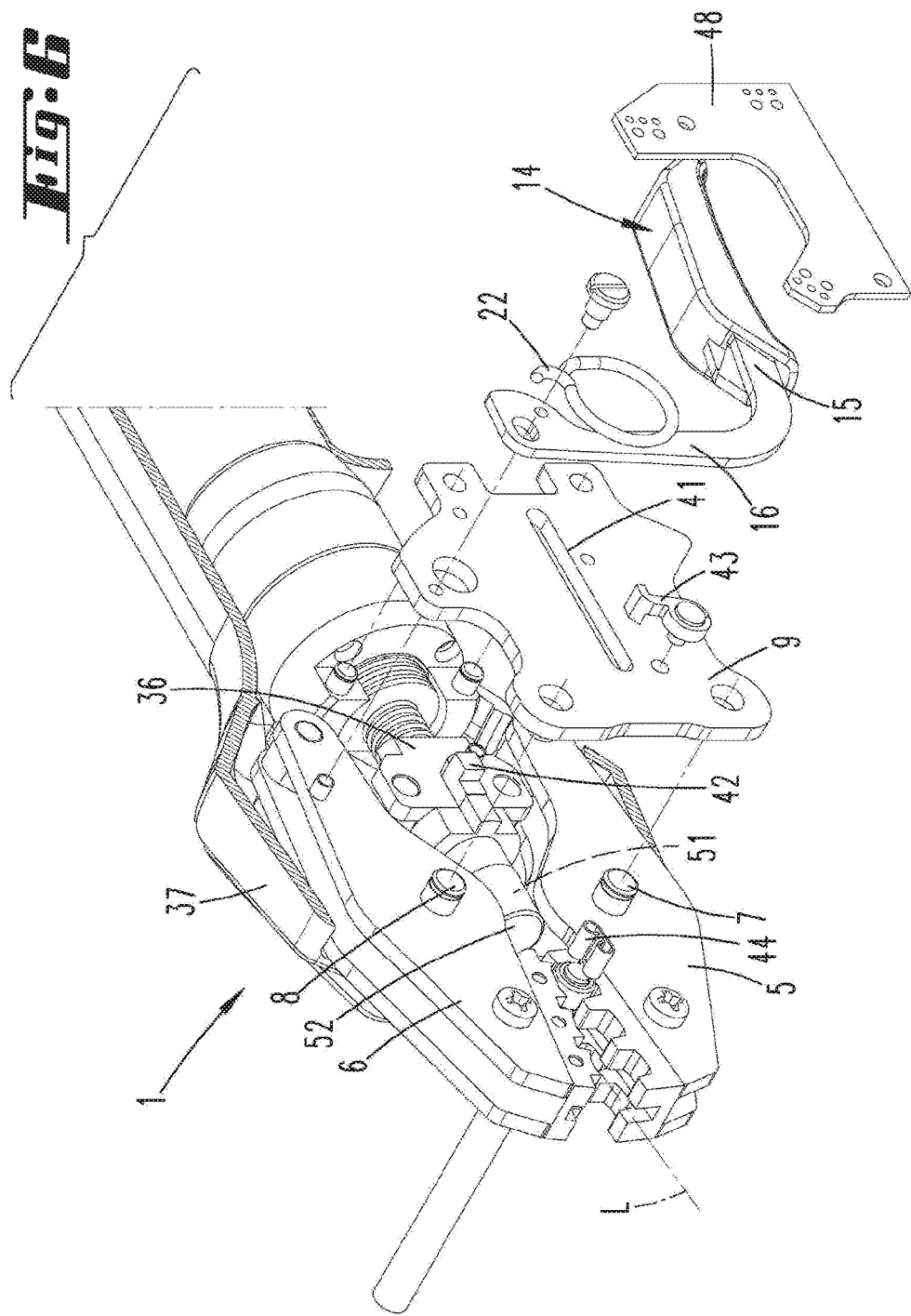
FIG. 6 is an exploded view of the device head in accordance with FIG. 5.

From the exploded view of FIG. 6 it can be deduced that the support part 9 which supports the axles 7, 8 of the pressing jaws 5, 6, preferably also has a guide recess 41. The guide recess 41 is more preferably formed as an elongated slit. In the guide recess 41, a guide projection 42 of the impinging part 36 can be guided. The guide projection 42 can extend so far through the guide recess 41, as can also be deduced for example from FIG. 7, that it serves as a counterstop for the lever section 16.

Figure 7:
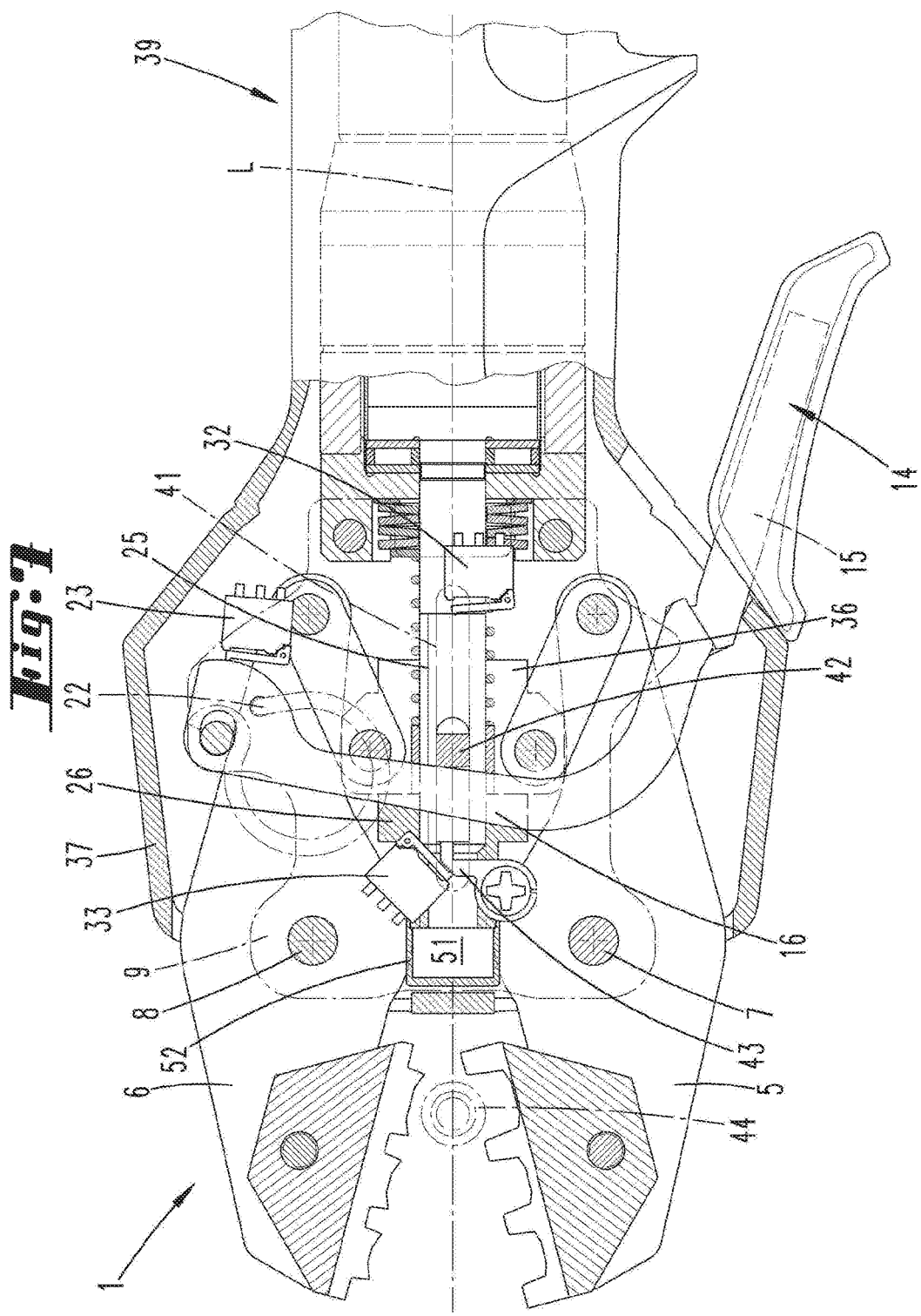
FIG. 7 is a plan view of the device head in accordance with FIG. 5.

The switch 33 provided at the jaw end of the manual pressing tool or at the spindle end can preferably, and also independently of the exemplary embodiment shown in FIG. 6 or FIG. 7 for example, can be activated by a rotationally mounted lever 43. The lever section 16 in this case acts upon the lever 43 and this acts upon the switch 33.

Figure 8:
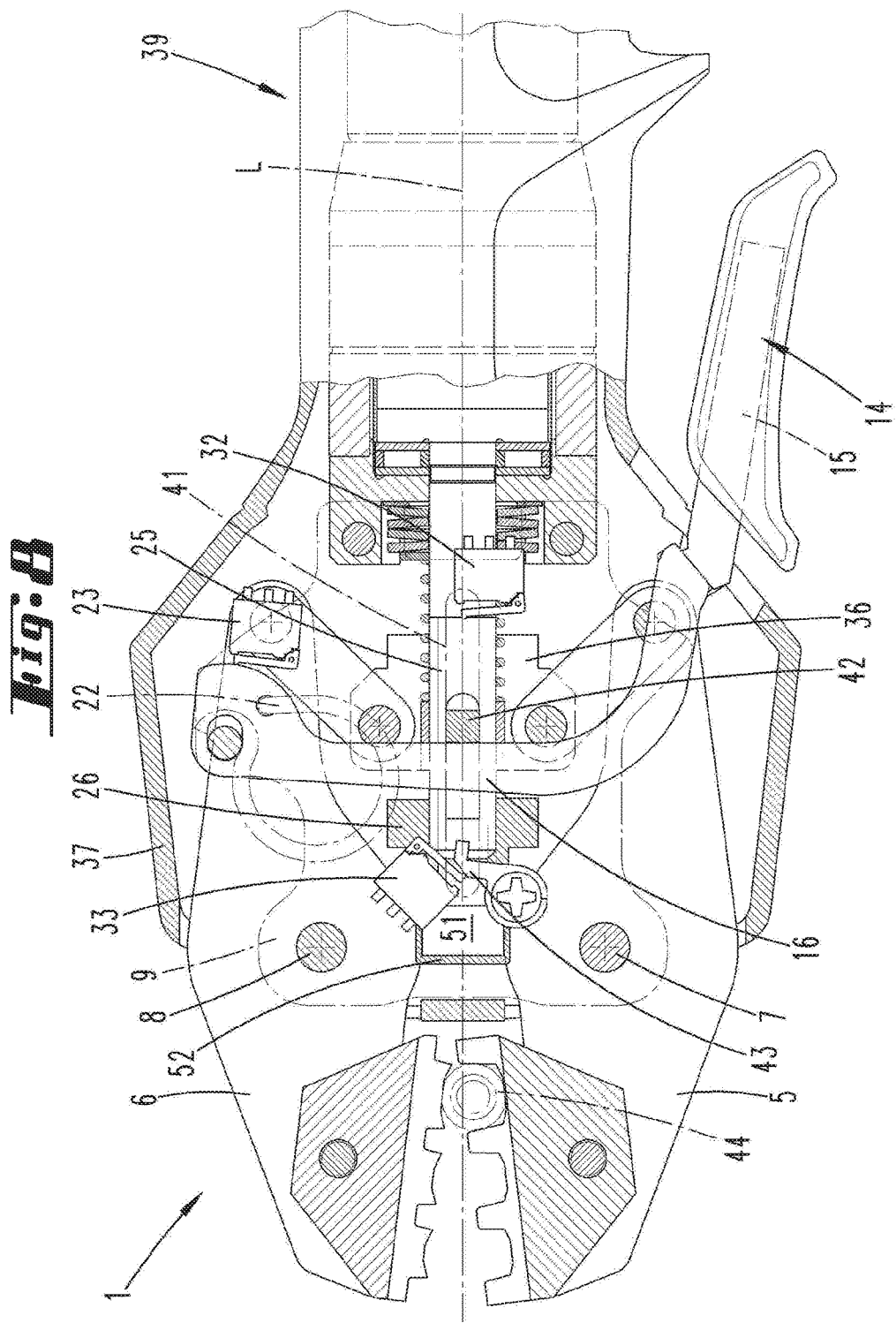
FIG. 8 is a view in accordance with FIG. 7, after a first manual activation of the lever.

In FIG. 8, the manually operated position, which is not yet triggering any motor activation, is shown. A press blank 44 is already held in the jaws of the pliers with a certain contact pressure, however.

Figure 9:
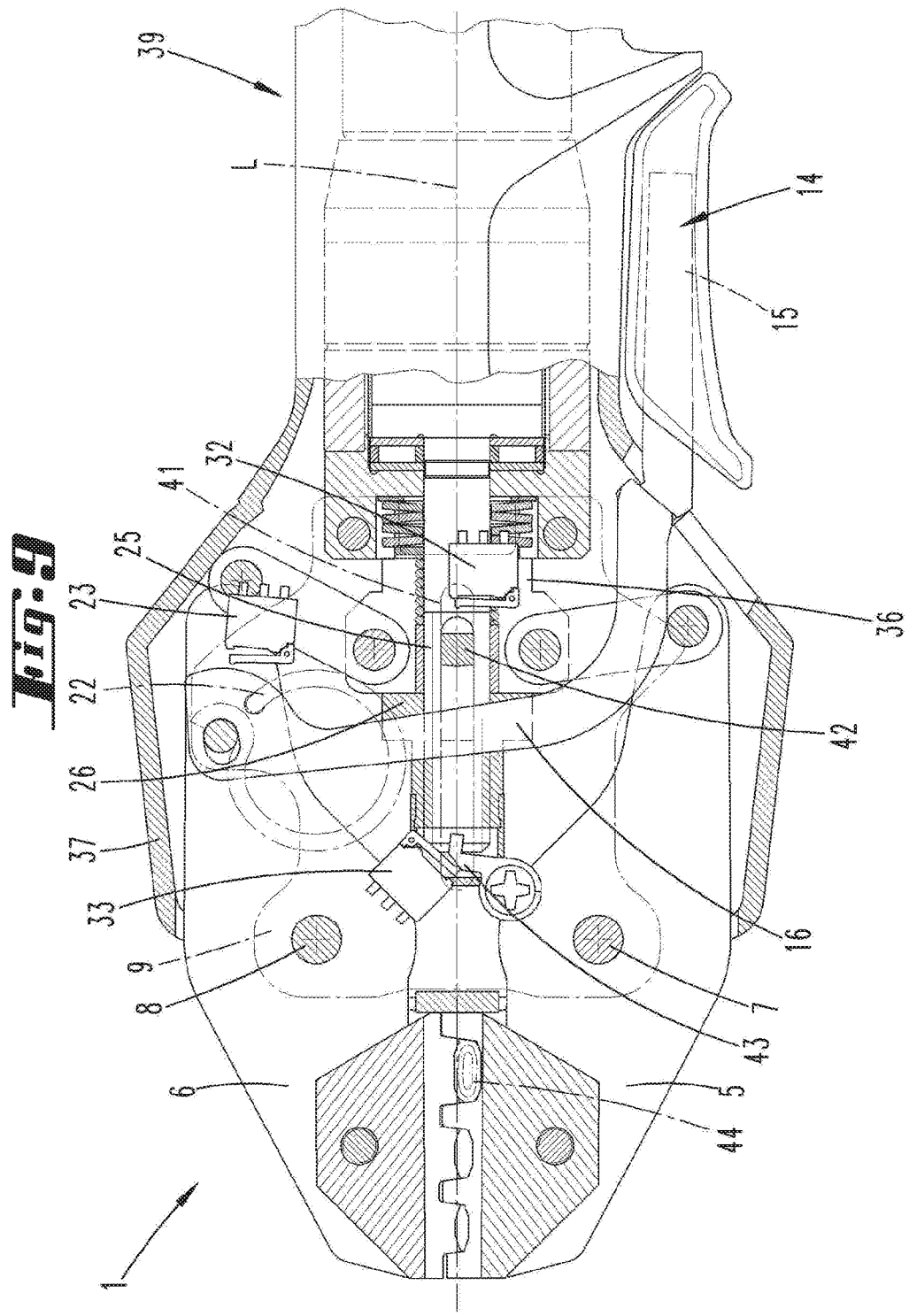
FIG. 9 is a a representation in accordance with FIG. 7 and/or FIG. 8, after further pivoting of the lever part and subsequent motor activation.

In FIG. 9, the complete closure of the pressing jaws 5, 6 is illustrated, after the motor activation has taken place. In this exemplary embodiment, as is preferred, a part of the impinging part 36, here the guide projection 42, is also used for activating the switch 32.

Figure 10:
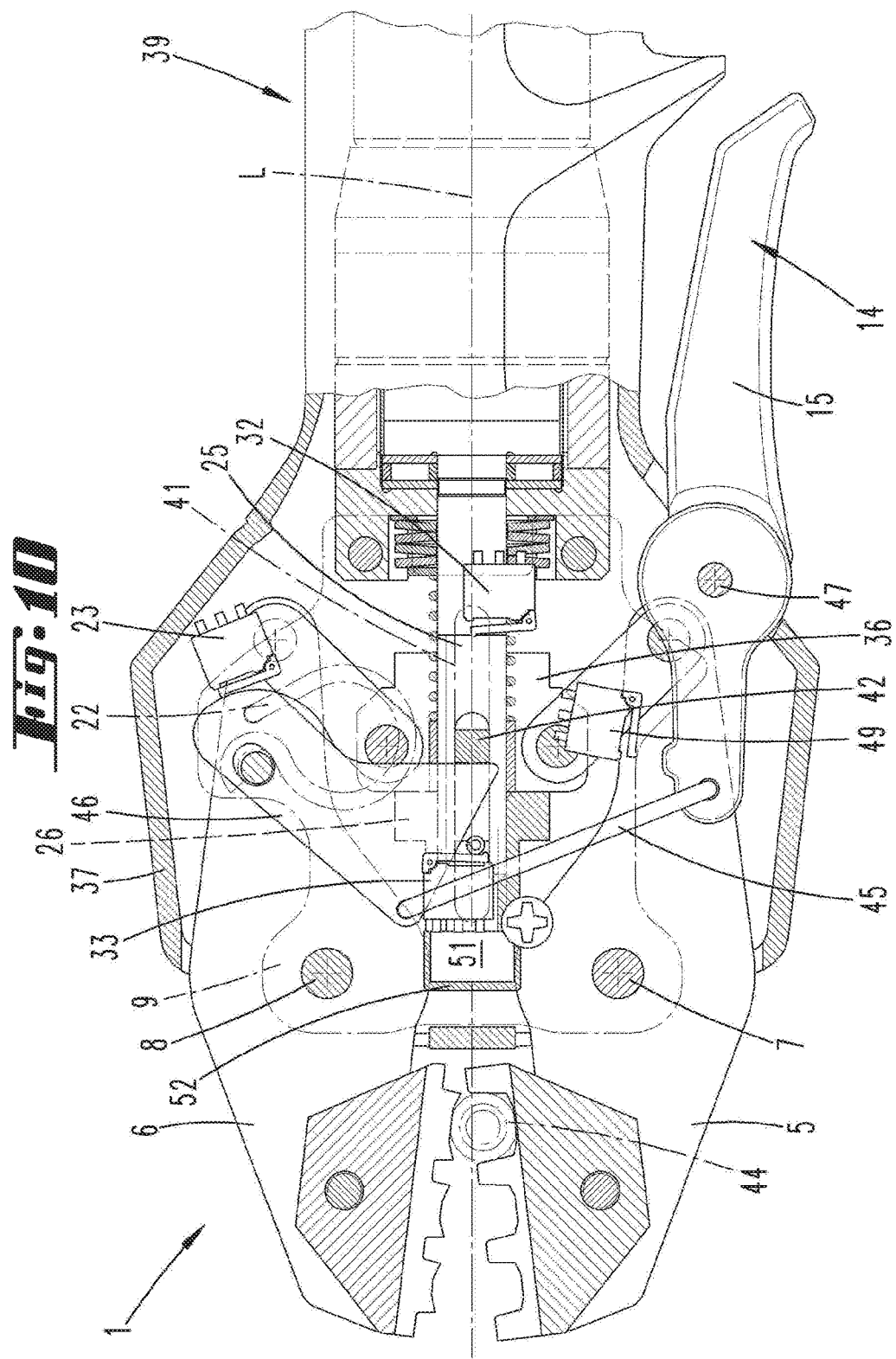
FIG. 10a is a representation of a further embodiment in a view in accordance with FIG. 8.
Figure 11:
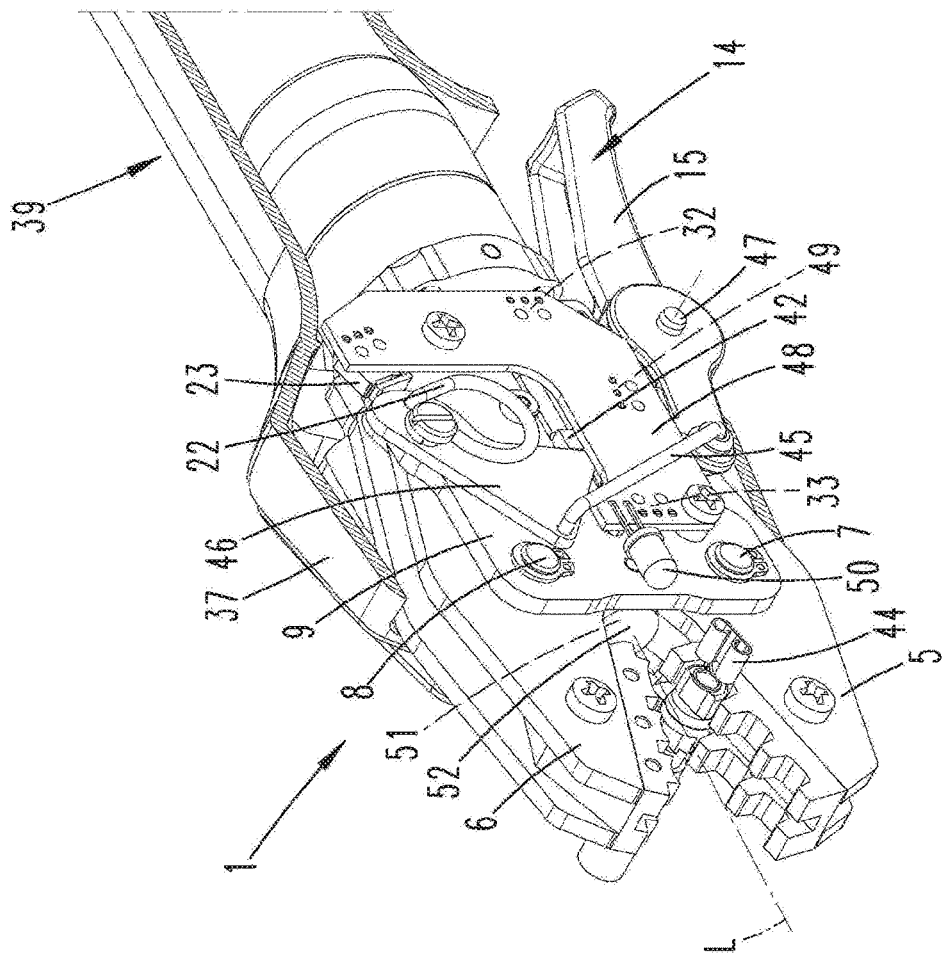
FIG. 11 is a perspective oblique front view of the embodiment in accordance with FIG. 10 before activation.
Figure 12:
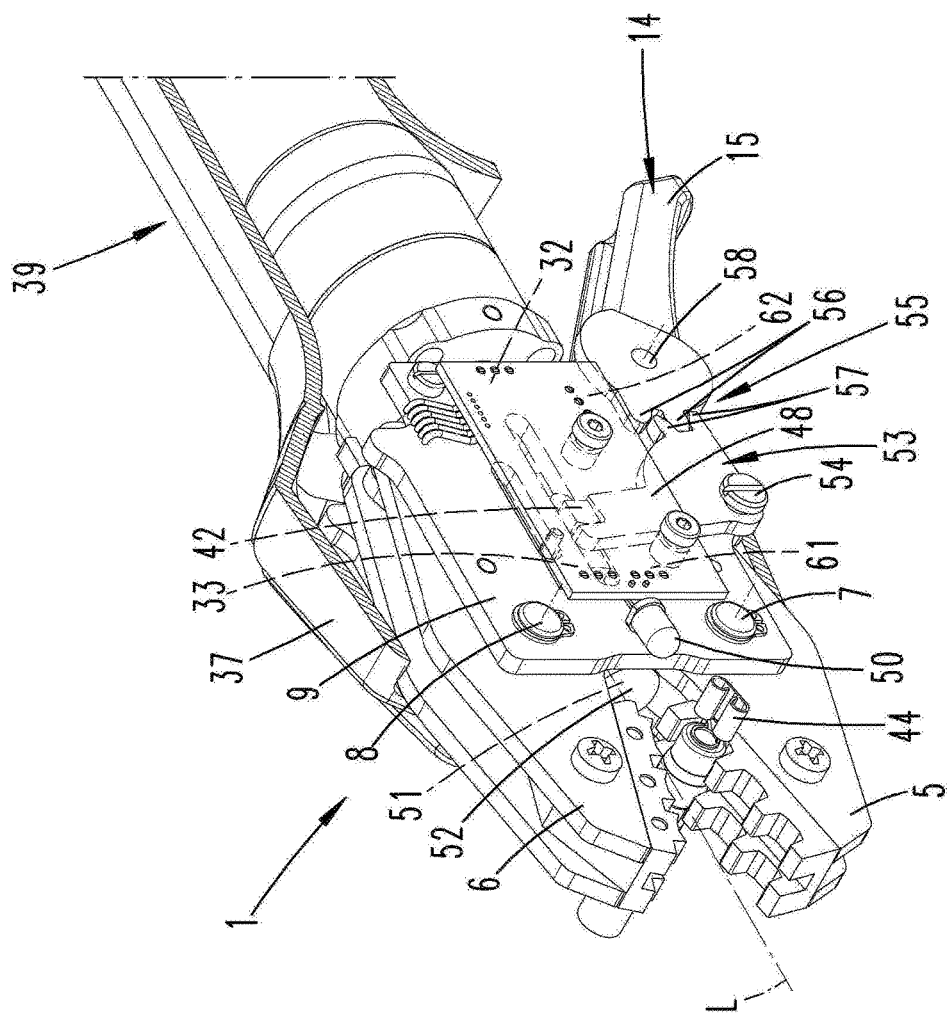
FIG. 12 is a perspective view of a further embodiment of the invention.
Figure 13:
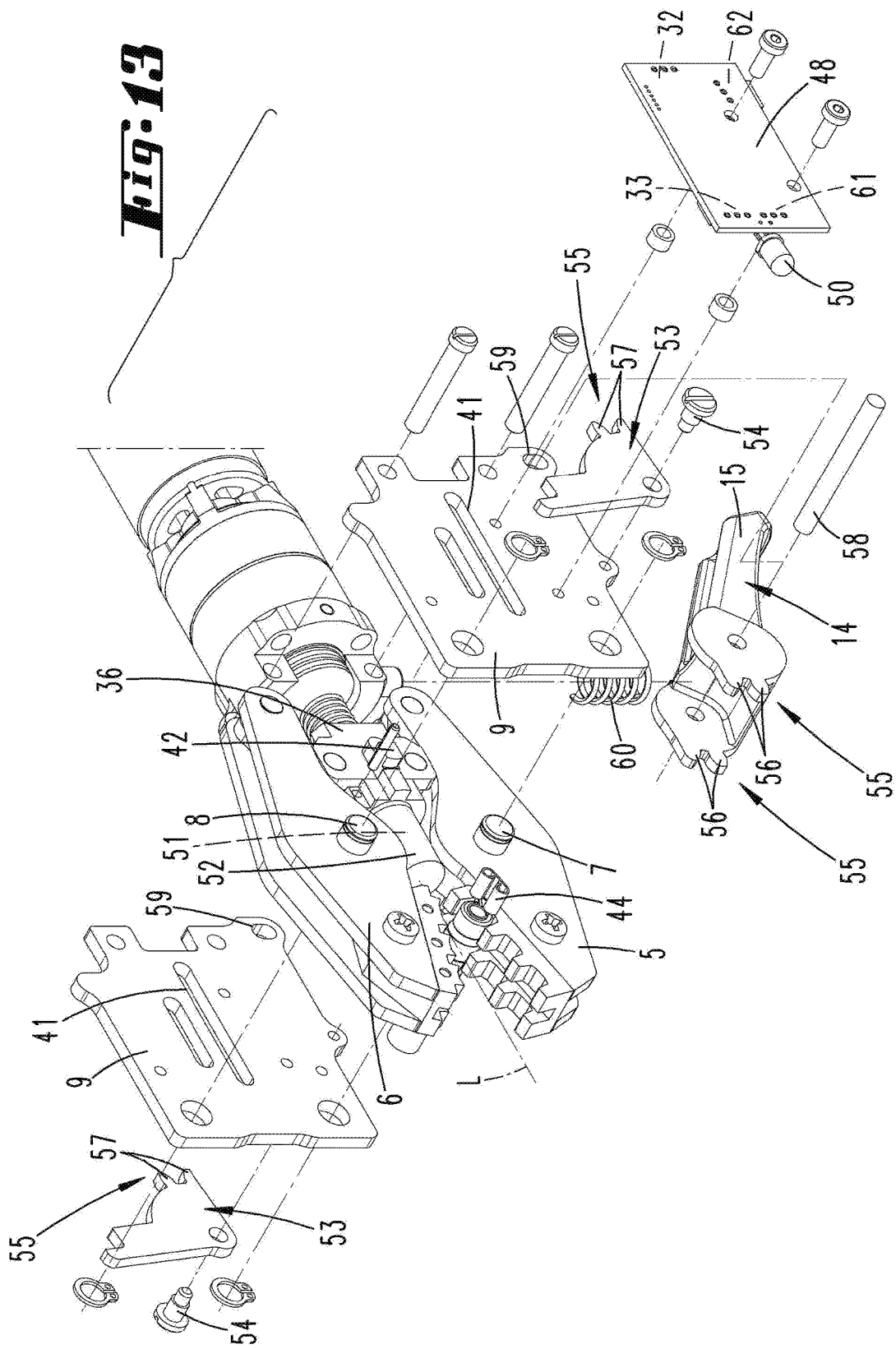
FIG. 13 is an exploded view of the embodiment in accordance with FIG. 12.

The additional embodiment shown with reference to the FIGS. 10 and 11 is characterized in that the lever part 14 acts upon a switch part 46 by means of a control arm 45. The switch part 46 is mounted in the same manner as the lever section 16 in the previously described exemplary embodiment, and is thus also pre-tensioned by the spring 22 in the same manner. The support of the switch part 46 on the impinging part 36 thus also provided here, preferably also on the guide projection 42, also produces the possible lever effect here, in order to trigger the motor support under in the event of stronger loading on the lever 14.

Under heavy loading the switch part 46 rotates about a support point on the guide projection 42, so that its end assigned to the switch 23 moves away from this (against the force of the spring 22) and as a result the motor is switched on in order to trigger the motor activation of the impinging part 36.

In the embodiment of FIG. 10 as is evident, the lever 14 is more preferably mounted on the side of the spindle 25, cf. axis of rotation 47 on which the lever section 16 is also free to be activated.

From the illustration of FIG. 11 it can be seen that in the exemplary embodiment a circuit board 48 is arranged, and preferably above the support part 9. The circuit board 48 preferably supports all switches 23, 32 and 33 provided here. In this case another fourth switch 49 is preferably also provided. The switch 49 is used to interrupt motor activity if the lever section 15 is moved in the opposite direction to a movement that can be carried out to perform a pressing operation, which preferably and in the exemplary embodiment is directed towards the handle region 39. In this case an extension of the lever 15 can act on the switch 49, whereby the motor is disengaged, so that no further pressing operation takes place. At the same time this preferably also triggers the release of the impinging part, so that the jaws of the pliers open again.

Before a complete execution of a pressing operation, a release of the impinging part for a return stroke movement can thus be carried out by the activation of a switch. The release also preferably comprises the fact that the motor is switched on again with the opposite rotation direction, the travelling part is thereby moved back and the release of the impinging part therefore takes place.

In the exemplary embodiment, a lighting means 50 is additionally arranged on the circuit board 48, in the form of a light-emitting diode. The lighting means 50 radiates, in the direction of a movement of the impinging part 36, directed towards the free end of the pressing jaws 5, 6. A corresponding opening, or light aperture is preferably also provided in one or both above mentioned housing covers 37, 38 for this purpose.

It is further preferred, as is clear for example from FIG. 8, that a lubricant supply 51 is provided, assigned to a free end of the spindle 25. The lubricant supply 51 is accommodated in a sheath 52, which is arranged with its opening directed towards the spindle, and preferably also overlapping the free end of the spindle.

With reference to FIGS. 12 to 19, a further embodiment and the related sequence of events during an activation is described. Equivalent parts are labeled with the same reference numerals.

An intermediate part, implemented in the embodiment of FIGS. 10 and 11 as a control arm 45, is implemented in the embodiment of FIGS. 12 to 19 as an intermediate lever 53. The intermediate lever 53 is fixed to the housing via an axle 54. The intermediate lever 53, which however can evidently apply in the same manner to the lever or lever section 16 or the control arm 45 of the previous embodiments, is guided underneath the circuit board 48.

The intermediate lever 53 is more preferably implemented as an angled lever. In areas extending at an angle, preferably approximately at right-angles to each other, firstly the cooperation with the lever part 14 is provided and secondly the cooperation with the guide projection 42.

The cooperation with the guide projection 42 is preferably provided by a positive-locking fit. A stepped recess on the intermediate lever 53 creates an impingement surface that rests on the guide projection 42 in a direction facing away from the pressing jaws.

The cooperation of the intermediate lever 53 and the lever part 14 is also preferably provided in a positive-locking manner in this exemplary embodiment. Specifically, a toothing system 55 is implemented. In this arrangement preferably only a few teeth are realized in each case, in the execution example two teeth.

Of importance also is the fact that the teeth 56 of the lever part 14 have a greater width than the teeth 57 of the intermediate lever 53. This is possible, for example, because the intermediate lever 53 preferably consists of a harder material and/or one with a higher load-bearing capacity than the lever part 14: the lever part 14 preferably consists of a hard plastic while the intermediate lever part 53 is a metal part.

The triggering of the pressing operation by overcoming a manually applied clamping pressure is provided in the exemplary embodiment of FIGS. 12 to 19 by a mobility of the lever part 14 relative to the housing.

Specifically, the lever part 14 has a mounting axle 58, which is accommodated in a slot 59 on the housing. By means of a pressure spring 60 supported on the housing, in the starting condition of e.g. FIG. 14 the lever part 14 is pre-tensioned with its mounting axle 58 against one end of the slot 59. In the course of an activation, compare the difference between FIGS. 15 and 16, if as a result of which a manually applied clamping pressure on the workpiece located in the crimping jaws is exceeded, the lever part 14, together with the mounting axle 58, is displaced in the slot/slots 59 respectively, in the exemplary embodiment in the direction of the spindle 25. The switch 62, which functionally corresponds to the switch 23 already described above, is thus activated. Here with the difference that the switch 62 is directly acted upon by the lever part 14.

By activation of the switch 62 the motor is started and with it in the exemplary embodiment the rotation of the spindle 25 is triggered, and as a result also the movement of the travelling part 26 and therefore the motorized movement of the pressing jaws 5, 6 into the pressing position.

Figure 14:
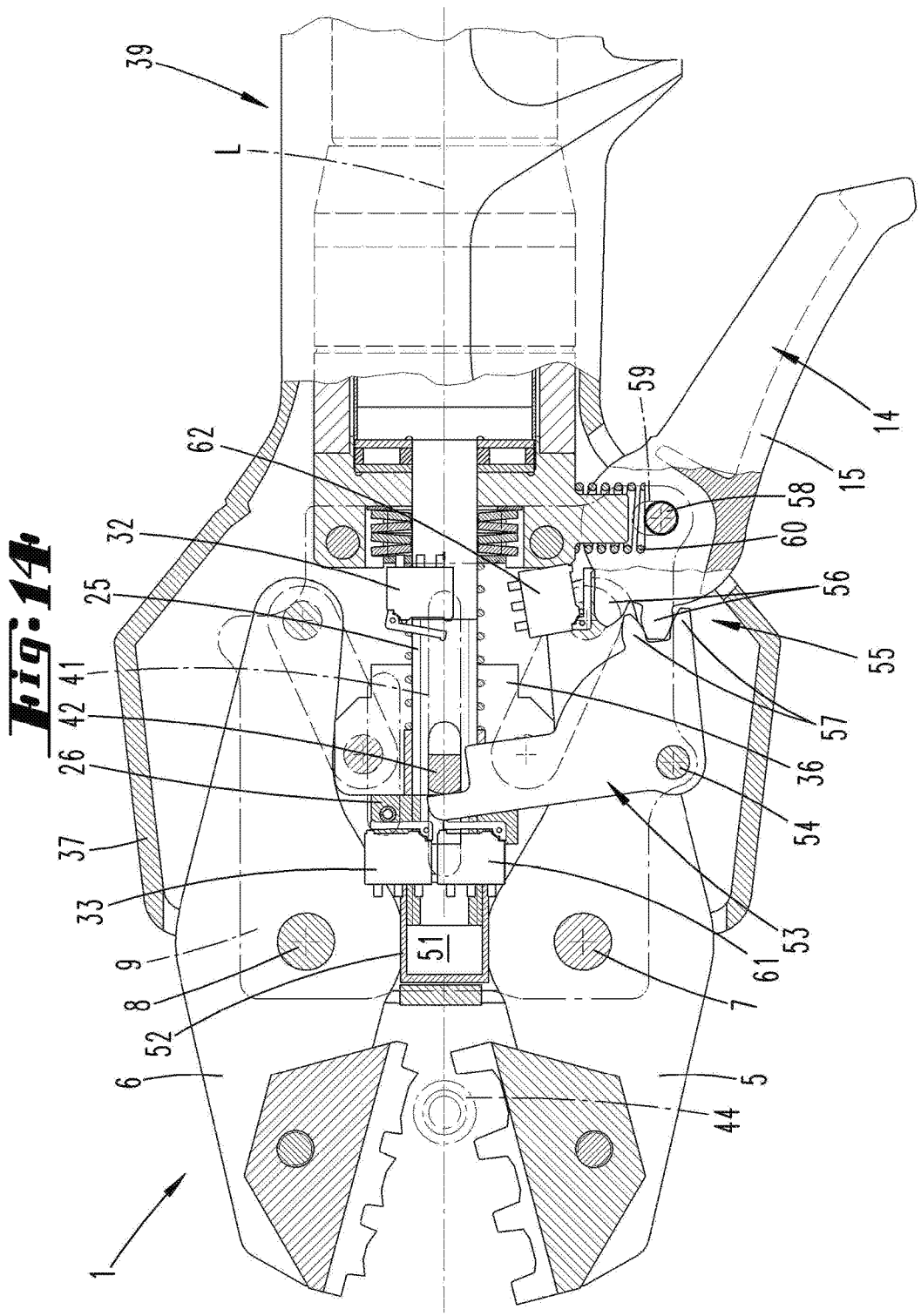
FIG. 14 is a side view of the embodiment in accordance with FIG. 12 and/or FIG. 13, in a non-activated position.
Figure 15:
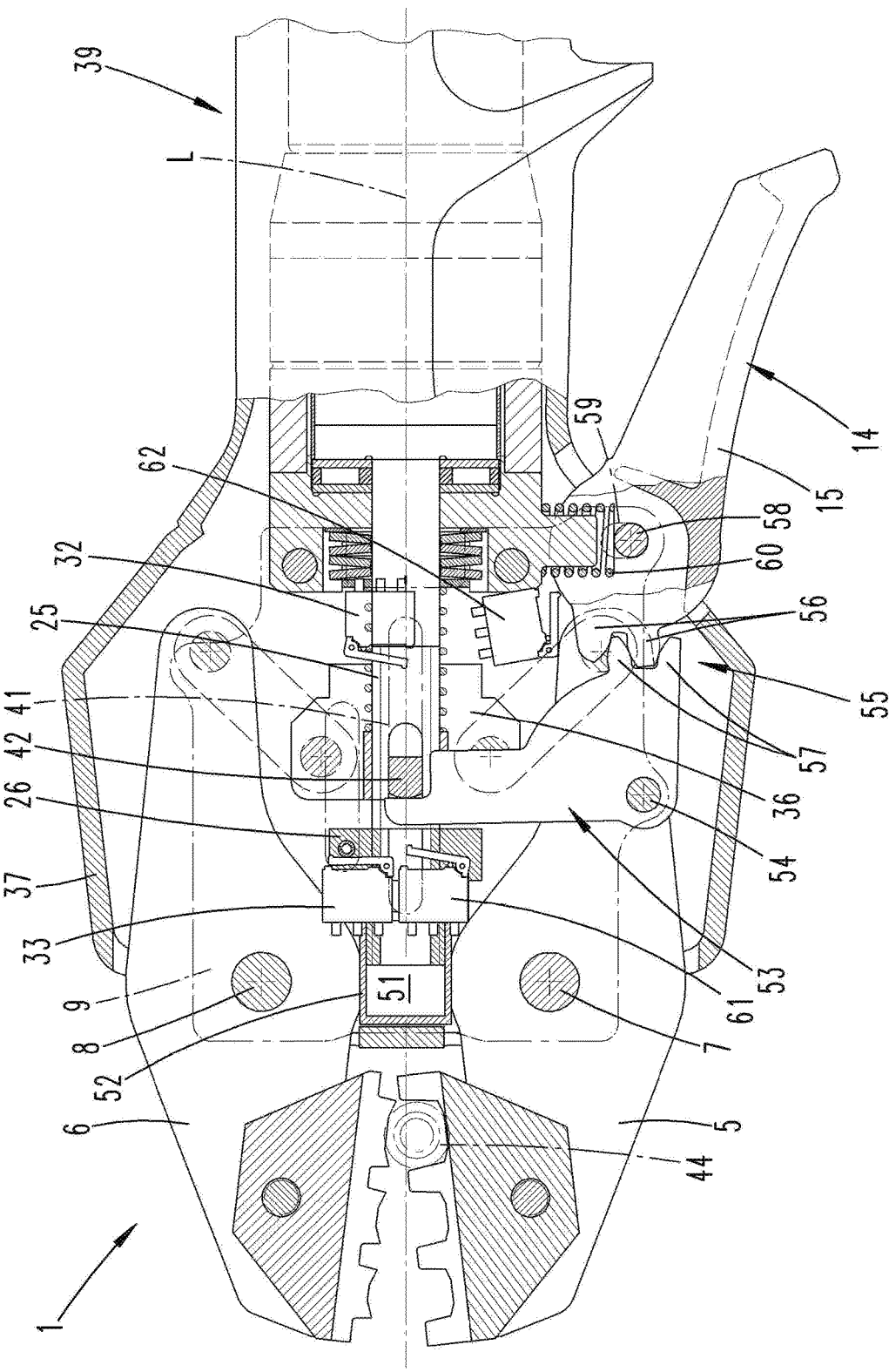
FIG. 15 is a representation in accordance with FIG. 14 in a first manual activation to clamp a workpiece.
Figure 16:
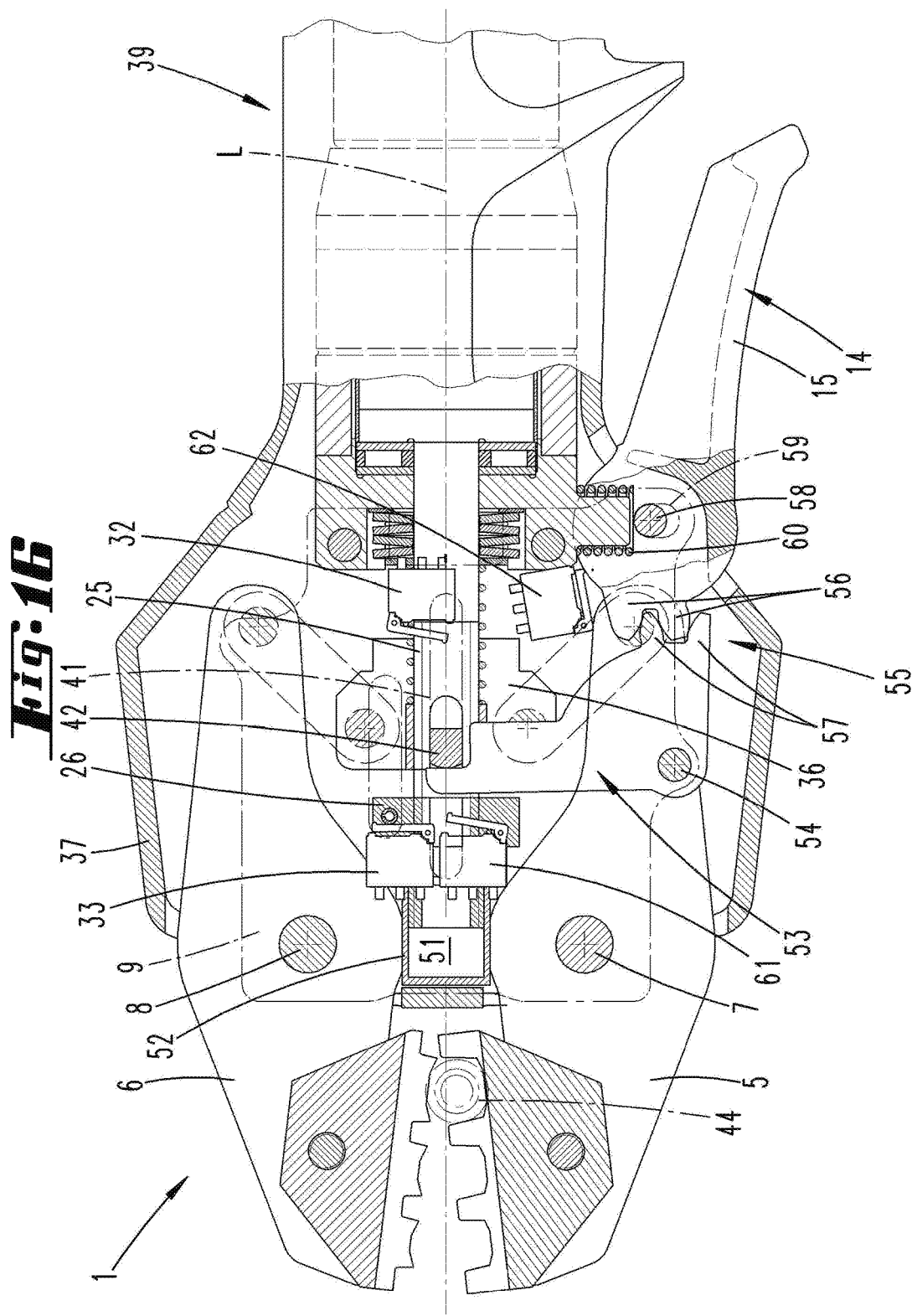
FIG. 16 is a continuation of the activation starting from the representation in accordance with FIG. 15, with the motorized operation triggered.
Figure 17:
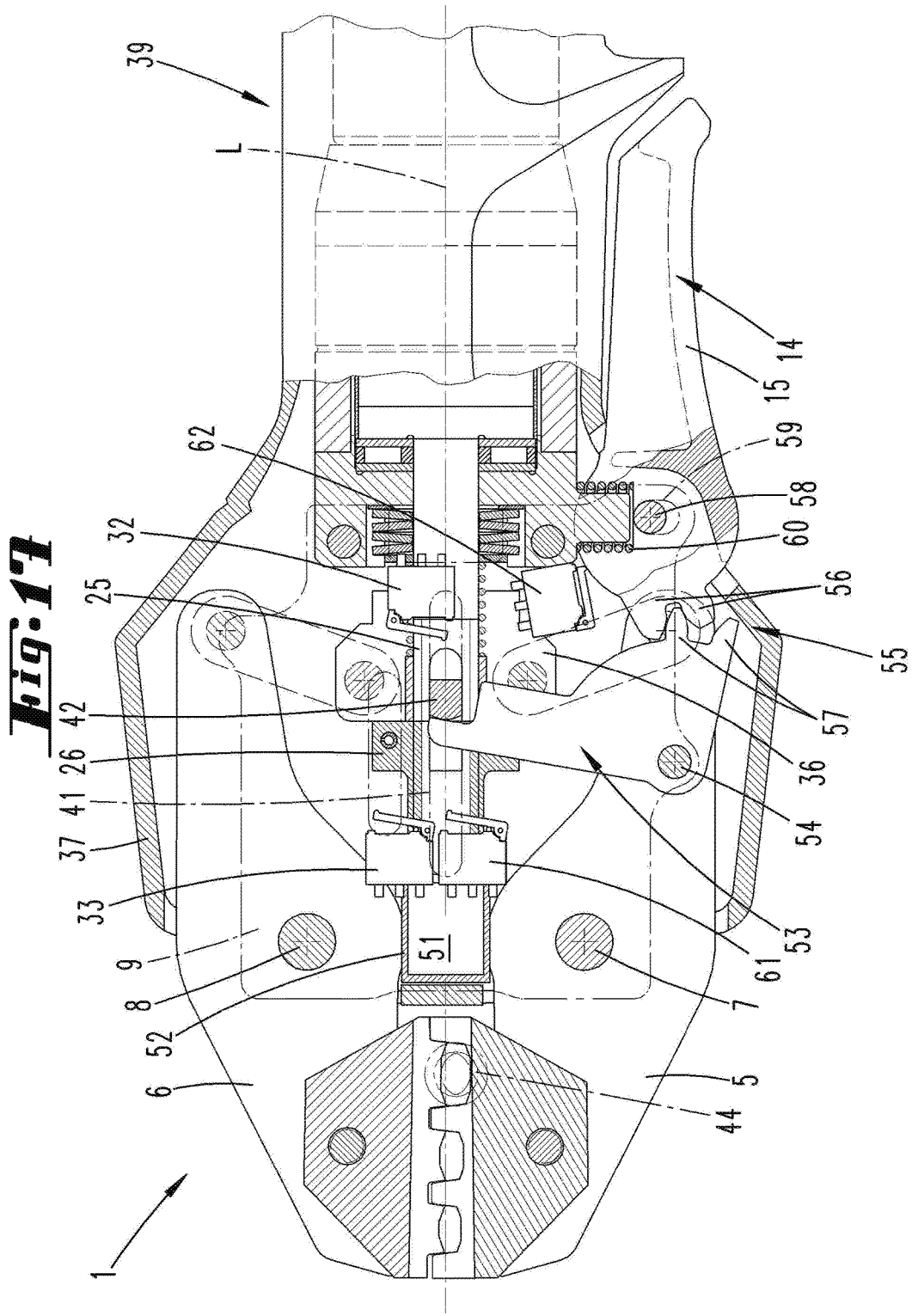
FIG. 17 is a representation in accordance with FIG. 14 during the motor supported pressing operation.
Figure 18:
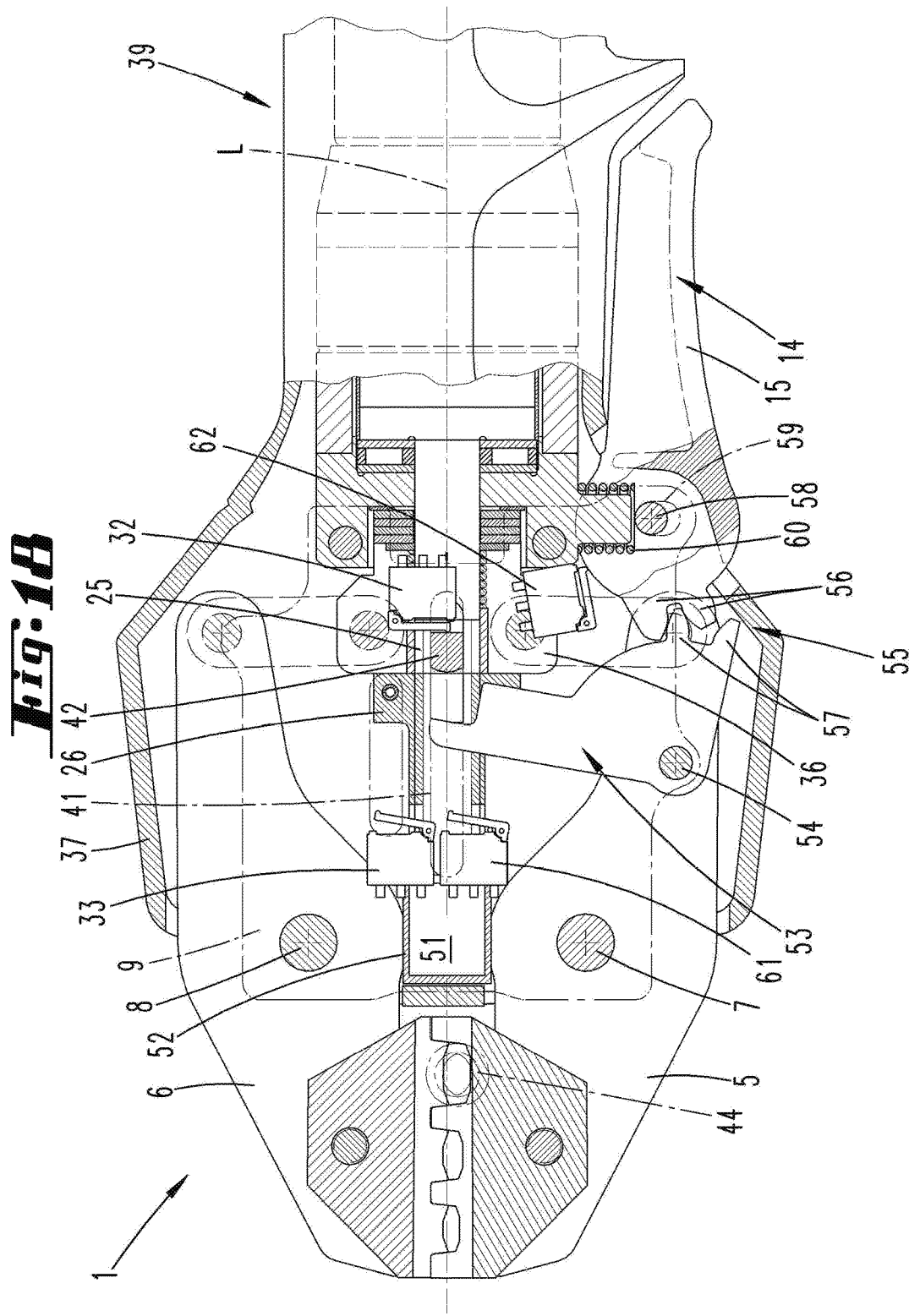
FIG. 18 is a representation in accordance with FIG. 17, at the termination of the motorized pressing operation.
Figure 19:
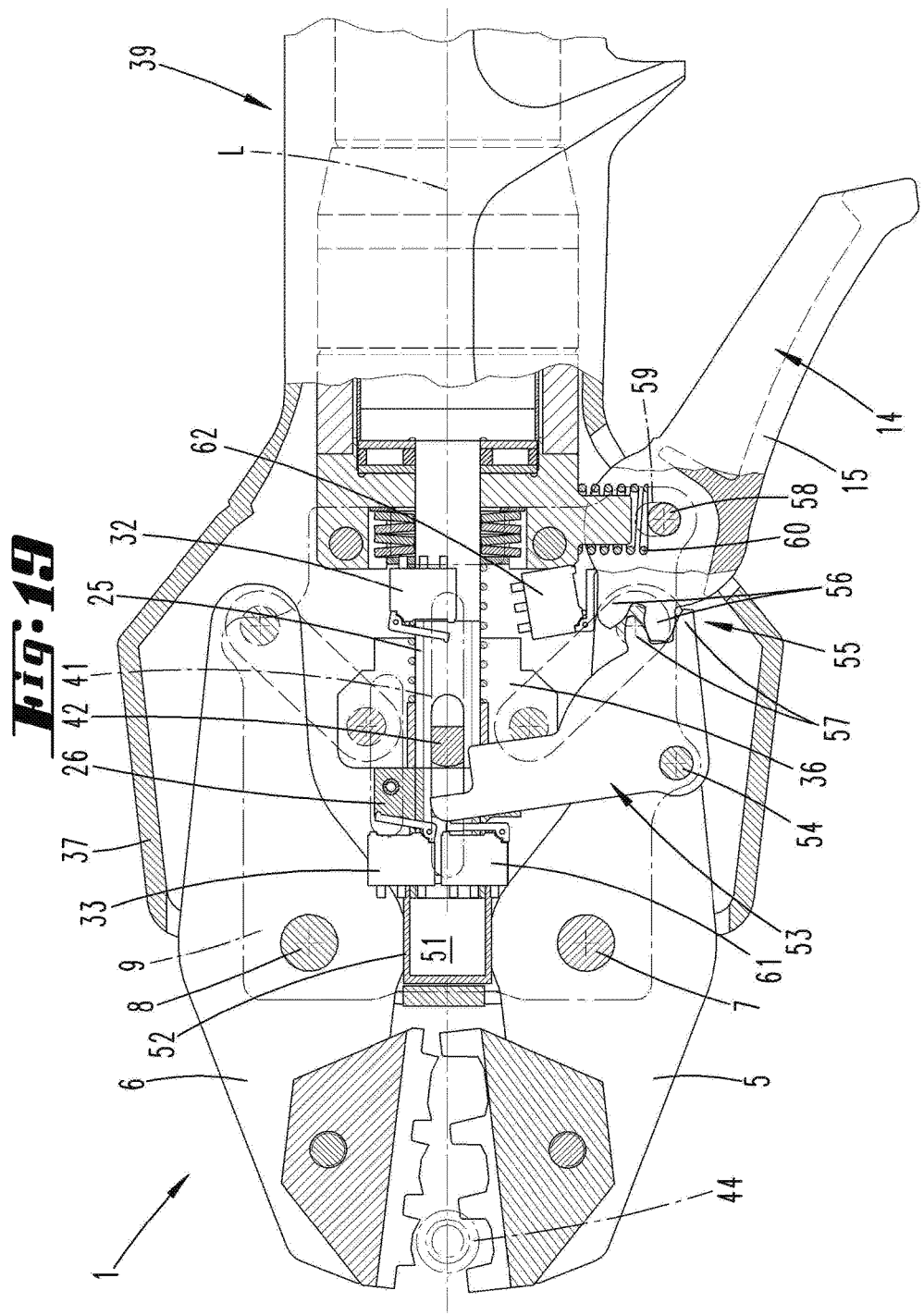
FIG. 19 is a representation relating to emergency unlocking.

While in manual operation, compare the difference between the positions in FIGS. 14 and 15, only the impinging part 36 is first moved along the spindle, after the motor operation is started, compare the difference between FIGS. 16 and 17, the spindle causes the travelling part 26 to move, which then by exertion of pressure on the impinging part 36 causes the motor supported pressing operation to be carried out.

The attainment of the pressing position, as also in the case of the exemplary embodiments described above, is detected by the switch 32.

The switch 33 is provided for the start/end of the motor operation respectively. If the motor operation is started via the switch 62, the switch 33 detects the actual motion of the travelling part 26 or the return of the travelling part 26 back into its original position, whereupon the motor switches off.

In addition a facility for an emergency activation is provided. In the exemplary embodiment this is obtained concretely by means of the switch 61. The intermediate part, or concretely the intermediate lever 53 in the exemplary embodiment, can also be moved by means of the lever part 14 in the opposite direction with respect to its impingement movement. For example on reaching the position of FIG. 16, if an emergency power off is desired, in this case the intermediate lever 53 can be moved counterclockwise, with respect to the illustration, in order thus to actuate the switch 61, cf. FIG. 18 (intermediate position) and FIG. 19.

The mounting axle 58 is additionally preferably connected to the lever part 14 in a rotationally fixed manner. As a result, a certain frictional resistance is produced during the movement of the lever part 14 with respect to the pressure spring 60. This counteracts an unintentional movement of the lever part 14 into the emergency position.

Such an increased friction can also be obtained by other measures. For example, by a somewhat tight passage of the mounting axle 58 in the slot 59.

In the exemplary embodiments of FIGS. 20 to 25 exemplary embodiments are shown in a schematic representation, in which the impingement of the pressing jaws (which as above, within the scope of the invention can also be cutting jaws) are represented by rolling bodies such as in particular, rollers.

Figure 20:
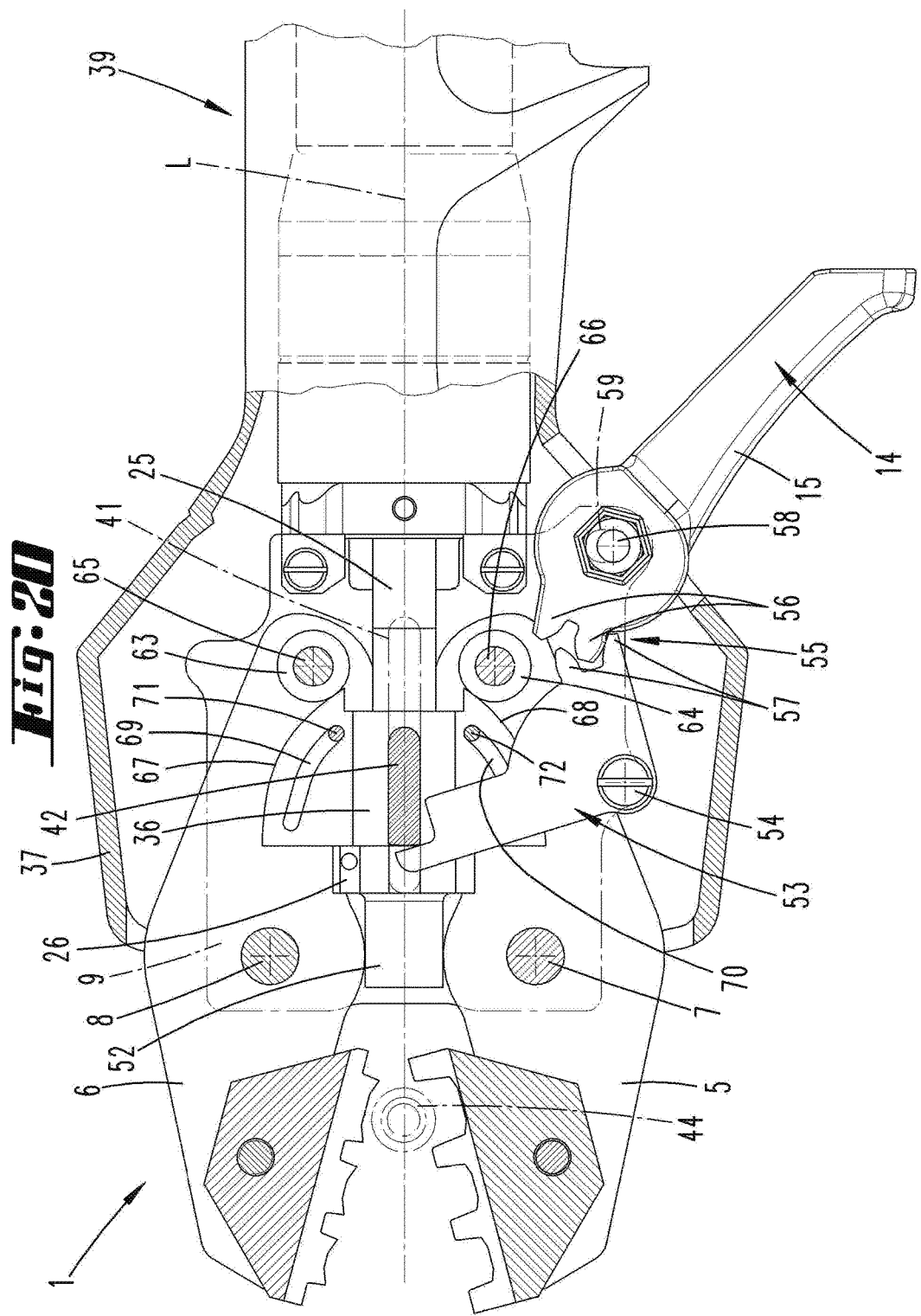
FIG. 20 is a representation of a further embodiment with roller activation with regard to the pressing jaws, with rollers in contact with the pressing jaws, in the open position.
Figure 21:
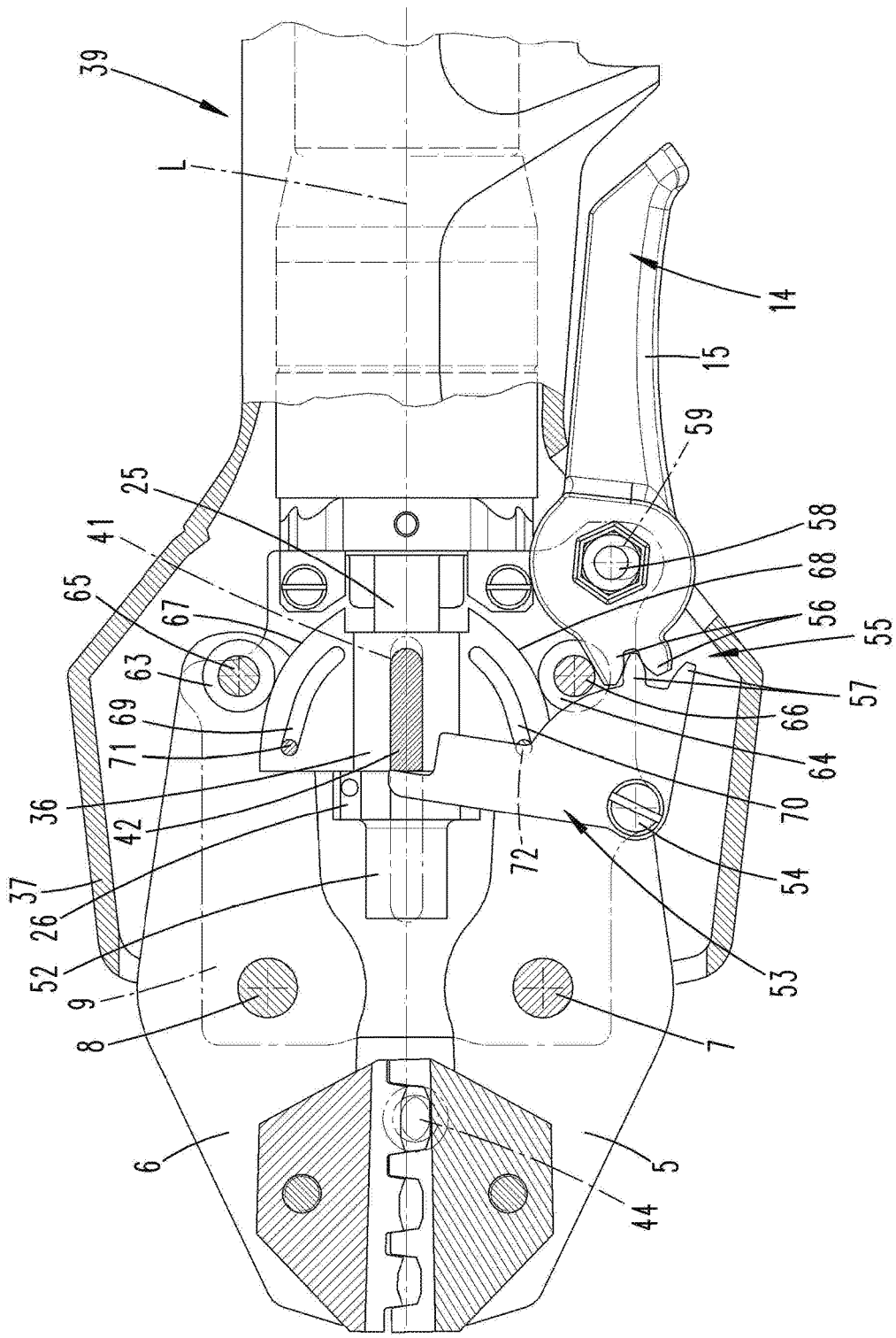
FIG. 21 is a representation in accordance with FIG. 20, in the closed position.

In the embodiment of FIGS. 20 and 21, two rolling bodies are mounted, here rollers 63, 64, each on one pressing jaw 5, 6. They can rotate about a respective axle 65, 66 rigidly connected to the pressing jaw 5, 6.

The impinging part 36 in this exemplary embodiment has unrolling edges 67, 68, that during the movement of the impinging part 36 relative to the spindle 25 or to a linear guide generally act upon the rollers 63, 64, and at the same time act upon the pressing jaws at their rear end region, that is to say on the end region of the pressing jaws 5, 6 facing the electric motor and/or the handle region, in a spreading manner or so as to move them apart. For this purpose the unrolling edges 67, 68 are formed such that they increase in width with respect to their edge contour towards the jaw side of the tool. It is obvious that in a lateral view of the unrolling edge by contrast, this manifests itself preferably as an unrolling surface. The unrolling surface can in this context correspond to a height (extension in the axial direction) of the rollers 63, 64 or to a part of this height, of approximately 1/10 to 9/10 of the height.

The impinging part 36 further comprises one or two guide recesses 69 and 70 respectively, with which the pressing jaws 5, 6 cooperate, in the execution example, via a pin 71, 72 respectively. The guide recess 69 or 70 is preferably formed, as is evident, as a slot. This guide recess 69, 70 and the pins 71, 72 cooperating therewith serve only to the mandatory return motion of the pressing jaws 5, 6 back into the opening position in accordance with FIG. 20 after execution of a pressing operation, i.e. from the position in accordance with FIG. 21. Preferably, virtually no substantial forces, in particular no compression forces, are thereby transmitted. The formation of a corresponding recess could also be provided on the pressing jaw and that of the pin on the impinging part.

Apart from this, the embodiment and the functional sequence in a device in accordance with FIGS. 20 and 21 correspond to one of the embodiments described above.

In particular the impinging part 36 here preferably also has a guide projection 42, and as a result of an action by the lever part 14, preferably on the guide projection 42, the pressing jaws 5, 6 are to be moved into a first clamping position via an initial manual activation. Alternatively a magnetic entrainment could also be provided, for example. This naturally also relates to all embodiments described here.

Figure 22:
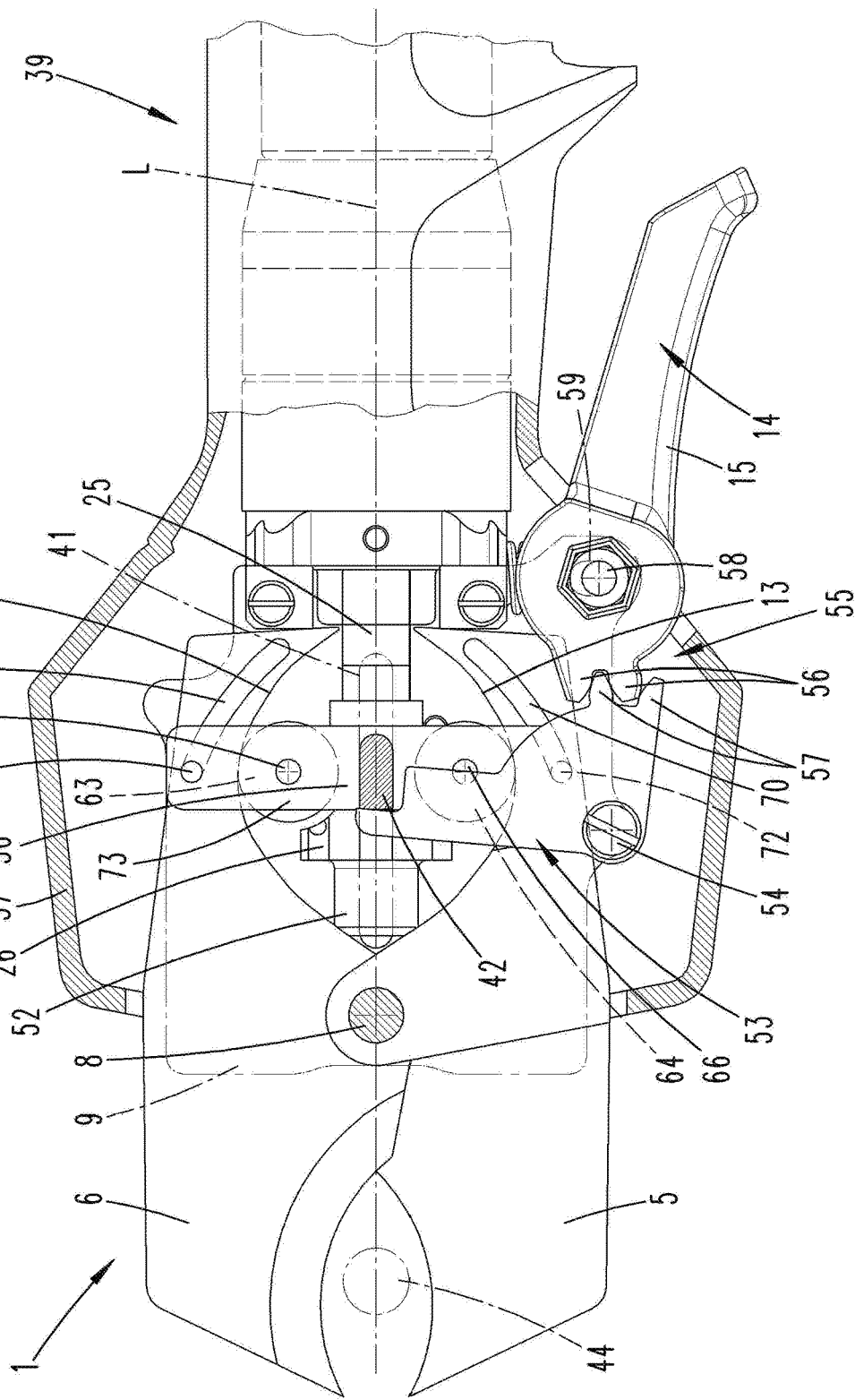
FIG. 22 is a further embodiment relating to activation using rollers, wherein the rollers are in contact with the impinging part, in the open position.
Figure 23:
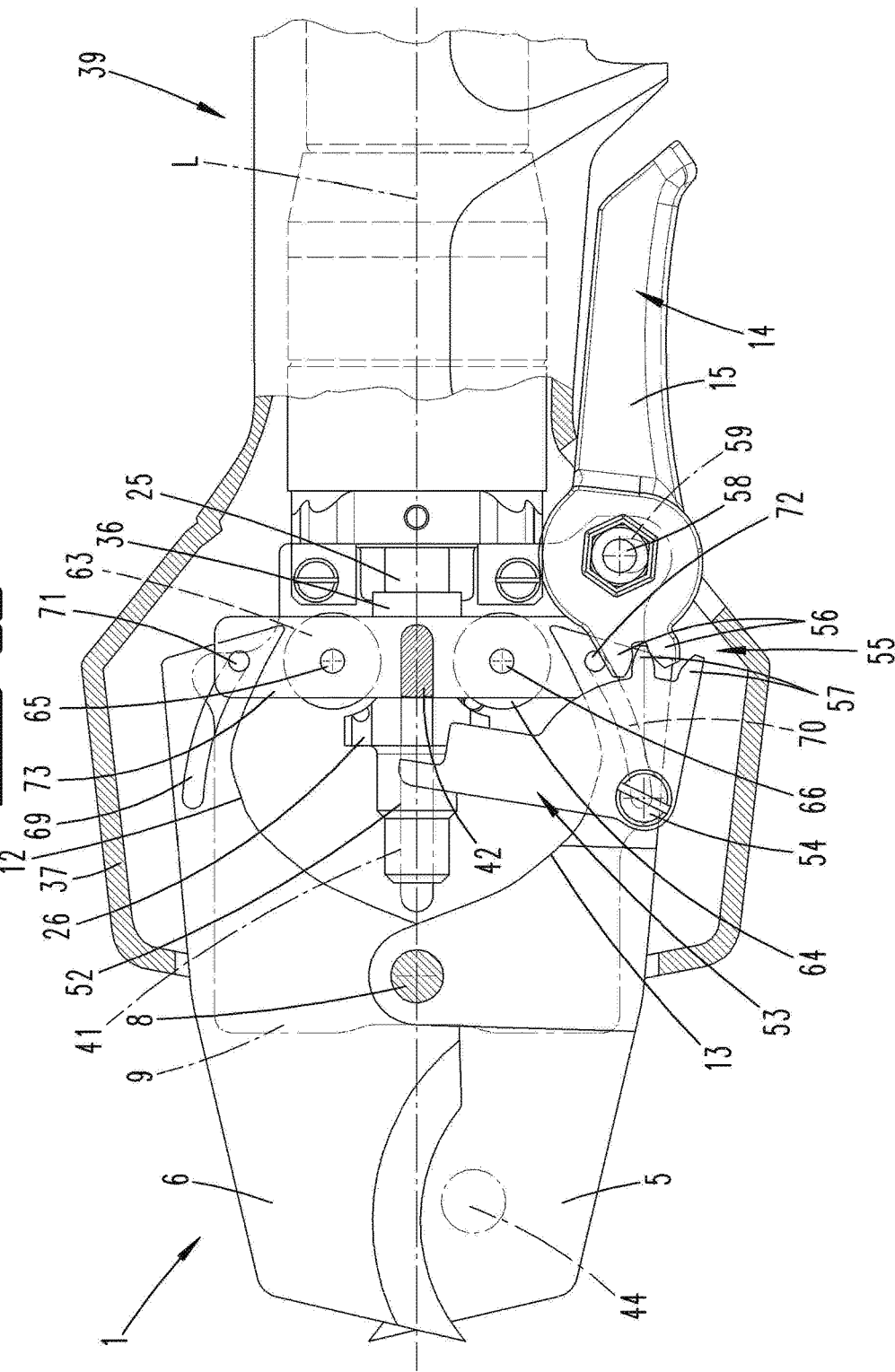
FIG. 23 is a representation in accordance with FIG. 22 in the closed position.

The embodiment of FIGS. 22 and 23 differs from the embodiments of FIGS. 20 and 21 essentially in that the rollers 63, 64 are mounted on the impinging part 36 and move with it. Correspondingly the axles 65, 66 are also mounted on the impinging part 36.

In similar manner a reversed configuration with respect to the guide recesses 69 and 70 is preferably also provided. These are now formed on the pressing jaws, the assigned ends of the pressing jaws 5, 6, while the pins 71, 72 are now rigidly connected to the impinging part 36.

In detail it is evident in the execution example that the impinging part 36 for mounting the axles 65, 66 or the pins 71, 72 comprises one or two opposite (in the illustrations only one is visible) mounting carriers 73. One mounting carrier extends at right angles to a longitudinal axis L or to an extension of the spindle 25.

For cooperating with the rollers 63, 64 the pressing jaws 5, 6 in the exemplary embodiments of FIGS. 20 to 25 respectively each have one concave shaped impingement region 12, 13.

Figure 24:
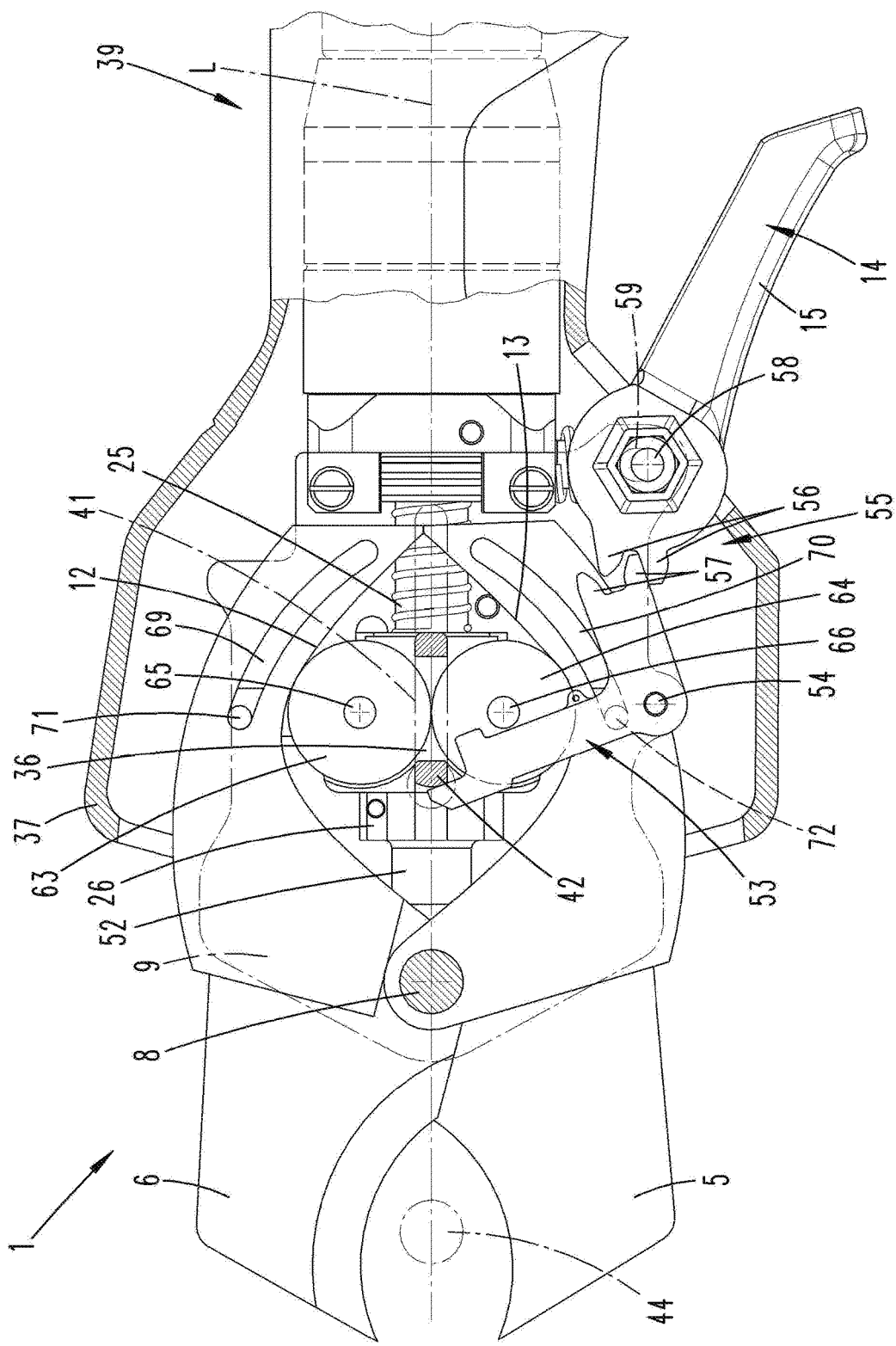
FIG. 24 is a further embodiment of an activation of the pressing jaws using rollers, with the rollers on the impinging part, wherein the rollers are directly supported against each other, in the open position.

In the exemplary embodiment of FIGS. 24 and 25, in contrast to the exemplary embodiment of FIGS. 22 and 23, two rollers 63, 64 are provided, which are directly braced against each other on their region facing away from an impingement region 12, 13 of a pressing jaw 5, 6. They roll off onto each other there. This is evidently favorable in terms of forces, since the compression forces now no longer have to be substantially absorbed in the axles 65, 66.

Because it is subsequently additionally preferable, however, that the spindle 25 or a corresponding linear guide continues to penetrate the impinging part 36, in the further detail of the exemplary embodiment given in FIGS. 24 and 25 four rollers 63, 64 are preferably provided, two of which are arranged in each case, preferably in alignment, one above the other. Between two cooperating rollers 63, 64, these pairs being arranged on one another, a stepped interval is accordingly produced which is used to provide the required access opening for the spindle 25 or linear guide.

Otherwise in this exemplary embodiment an identical functionality is also provided as is found in the exemplary embodiments described previously, with one or more of the possible different arrangements described there in detail.

All features disclosed are (per se) essential to the invention. The disclosure of the application hereby also incorporates the disclosed content of the associated/attached priority documents (copy of the preliminary application) in full, including for the purpose of incorporating features of those documents into claims of the present application. The dependent claims in their optionally stand-alone version characterize independent inventive extensions of the prior art, in particular for making partial applications on the basis of these claims.

LIST OF REFERENCE NUMERALS

| | |
|---|---|
| 1 | Pressing tool |
| 2 | Electric motor |
| 3 | Gearing system |
| 4 | Rechargeable battery |
| 5 | Pressing jaw |
| 6 | Pressing jaw |
| 7 | Axle |
| 8 | Axle |
| 9 | Support part |
| 10 | Working region |
| 11 | Working region |
| 12 | Impingement region |
| 13 | Impingement region |
| 14 | Lever part |
| 15 | Lever section |
| 16 | Lever section |
| 17 | Rotary joint |
| 18 | Rotary mounting region |
| 19 | Slot |
| 20 | Pin |
| 21 | Counter-bearing |
| 22 | Spring |
| 23 | Switch |
| 24 | Switching arm |
| 25 | Spindle |
| 26 | Travelling part |
| 27 | Control arm |
| 28 | Control arm |
| 29 | Reset spring |
| 30 | first part |
| 31 | second part |
| 32 | Switch |
| 33 | Switch |
| 34 | Housing |
| 35 | Round section |
| 36 | Impinging part |
| 37 | Housing cover |
| 38 | Housing cover |
| 39 | Handle region |
| 40 | Housing receptacle |
| 41 | Guide recess |
| 42 | Guide projection |
| 43 | Lever |
| 44 | Press blank |
| 45 | Control arm |
| 46 | Switch part |
| 47 | Rotational axis |
| 48 | Circuit board |
| 49 | Switch |
| 50 | Lighting Means |
| 51 | Lubricant supply |
| 52 | Sheath |
| 53 | Intermediate lever |
| 54 | Axle |
| 55 | Toothing system |
| 56 | Teeth |
| 57 | Teeth |
| 58 | Mounting axle |
| 59 | Slot |
| 60 | compression spring |
| 61 | Switch |
| 62 | Switch |
| 63 | Roller |
| 64 | Roller |
| 65 | Axle |
| 66 | Axle |
| 67 | Unrolling edge |
| 68 | Unrolling edge |
| 69 | Guide recess |
| 70 | Guide recess |
| 71 | Pin |
| 72 | Pin |
| 73 | Mounting carrier |
| L | Longitudinal axis |
| u | Overlap region |

The invention claimed is:

1. A pressing tool comprising:
a fixed support part;
a pressing jaw pivotably mounted on the fixed support part about a pivot axis, the pressing jaw forming a working area on a first side of the pivot axis and an impingement region on a second, opposite side of the pivot axis, the impingement region extending in a longitudinal direction of the pressing jaw;
a motor;
an impinging part that is movable relative to the impingement region in the longitudinal direction of the impingement region, wherein in order to carry out a pressing operation the impingement region can be acted upon with the impinging part by exertion of manual force and by force from the motor; and
a travelling part movable relative to the impinging part;
wherein the impinging part is movable between a first position and a second position, wherein in the first position the impinging part is at a first distance relative to the travelling part or is in contact with the travelling part, wherein in the second position the impinging part is at a second distance relative to the travelling part, the second distance being greater than the first distance, wherein the impinging part is moved by hand into the second position, and wherein the travelling part is further movable through the second distance by motor force so as to contact the impinging part and move the impinging part.

2. A pressing tool having a longitudinal direction, comprising:
a fixed support part;
a first pressing jaw pivotably mounted on the support part about a first pivot axis, the first pressing jaw forming a first working area on a first side of the first pivot axis and a first impingement region on a second, opposite side of the first pivot axis, the first impingement region extending in the longitudinal direction of the tool;
a second pressing jaw pivotably mounted on the support part about a second pivot axis, the second pressing jaw forming a second working area on a second side of the second pivot axis and a second impingement region on a second, opposite side of the second pivot axis, the second impingement region extending in the longitudinal direction of the tool;
an electric motor;
a transmission;
an axially fixed threaded spindle having a longitudinal axis extending in the longitudinal direction of the tool, the spindle extending between the first and second impingement regions of the first and second pressing jaws, the spindle overlapping the first and second impingement regions perpendicular to the longitudinal axis thereof, wherein the electric motor, the spindle and the transmission are arranged one behind the other in the longitudinal direction of the tool; and
an impinging part longitudinally movable relative to the first and second impingement regions, wherein in order to carry out a pressing operation the first and second impingement regions can be acted upon with the impinging part by exertion of manual force on the impinging part and by force from the motor on the impinging part, the impinging part being pulled for completion of a pressing by the electric motor in a direction toward the electric motor.

\* \* \* \* \*